US012577365B2

(12) United States Patent
Kratish et al.

(10) Patent No.: US 12,577,365 B2
(45) Date of Patent: Mar. 17, 2026

(54) POLYESTER HYDROGENOLYTIC DECONSTRUCTION VIA TANDEM CATALYSIS

(71) Applicant: Northwestern University, Evanston, IL (US)

(72) Inventors: Yosi Kratish, Evanston, IL (US); Tobin J. Marks, Evanston, IL (US)

(73) Assignee: Northwestern University, Evanston, IL (US)

( * ) Notice: Subject to any disclaimer, the term of this patent is extended or adjusted under 35 U.S.C. 154(b) by 654 days.

(21) Appl. No.: 17/972,166

(22) Filed: Oct. 24, 2022

(65) Prior Publication Data

US 2023/0159722 A1 May 25, 2023

Related U.S. Application Data

(60) Provisional application No. 63/271,311, filed on Oct. 25, 2021.

(51) Int. Cl.
*C08J 11/16* (2006.01)
*C08J 11/10* (2006.01)

(52) U.S. Cl.
CPC ............ *C08J 11/16* (2013.01); *C08J 2367/02* (2013.01)

(58) Field of Classification Search
CPC .... C08J 2367/02; C08J 2367/00; C08J 11/22; C08J 11/10; B01J 2231/641; B01J 23/44
See application file for complete search history.

(56) References Cited

U.S. PATENT DOCUMENTS

| | | | | |
|---|---|---|---|---|
| 6,545,061 | B1 | 4/2003 | Murdoch | |
| 6,649,792 | B2 | 11/2003 | Sirek et al. | |
| 7,462,649 | B2 | 12/2008 | Nakao et al. | |
| 7,893,122 | B2 | 2/2011 | Fregoso-Infante et al. | |
| 2005/0096482 | A1 | 5/2005 | Tamada et al. | |
| 2005/0218109 | A1* | 10/2005 | Semersky ............ | B65D 23/104 215/396 |
| 2009/0318579 | A1 | 12/2009 | Ikenaga | |
| 2017/0152203 | A1 | 6/2017 | Essaddam | |
| 2019/0112419 | A1* | 4/2019 | Li ........................ | C08G 63/181 |
| 2019/0161595 | A1 | 5/2019 | Charra et al. | |
| 2023/0145136 | A1 | 5/2023 | Marks et al. | |

FOREIGN PATENT DOCUMENTS

| | | | |
|---|---|---|---|
| JP | 2005/350620 | A | 12/2005 |
| WO | WO 2015/190941 | A1 | 12/2015 |
| WO | WO 2016/096768 | A1 | 6/2016 |
| WO | WO 2017/087752 | A1 | 5/2017 |
| WO | WO 2018/007356 | A1 | 1/2018 |
| WO | WO 2021/211423 | A1 | 10/2021 |

OTHER PUBLICATIONS

Lohr et al; Energy and Environmental Science; vol. 9, 2016; pp. 550-564 (Year: 2016).*

Lohr et al; Catalysis; vol. 5; 2015; pp. 3675-3679 (Year: 2015).*

Krall et al; Chem. Commun., vol. 50; 2014; pp. 4884-4887 (Year: 2014).*

T. L. Lohr, Z. Li, R. S. Assary, L. A. Curtiss and T. J. Marks, Mono- and tri-ester hydrogenolysis using tandem catalysis. Scope and mechanism, *Energy Environ. Sci*., Sep. 2016, 550-564.

T. L. Lohr, Z. Li and T. J. Marks, "Thermodynamic Strategies for C—O Bond Formation and Cleavage via Tandem Catalysis," *Acc. Chem. Res*., 2016, 49, 824-834.

T. L. Lohr, Z. Li, R. S. Assary, L. A. Curtiss and T. J. Marks, "Thermodynamically Leveraged Tandem Catalysis for Ester RC(O)O—R' Bond Hydrogenolysis. Scope and Mechanism," *ACS Catal*., May 2015, 3675-3679.

Z. Li, R. S. Assary, A. C. Atesin, L. A. Curtiss and T. J. Marks, "Rapid Ether and Alcohol C—O Bond Hydrogenolysis Catalyzed by Tandem High-Valent Metal Triflate + Supported Pd Catalysts," *J. Am. Chem. Soc*., 2014, 136, 104-107.

R. S. Assary, A. C. Atesin, Z. Li, L. A. Curtiss and T. J. Marks, "Reaction Pathways and Energetics of Etheric C—O Bond Cleavage Catalyzed by Lanthanide Triflates," *ACS Catal*., Mar. 2013, 1908-1914.

T. L. Lohr, A. R. Mouat, N. M. Schweitzer, P. C. Stair, M. Delferro, T. J. Marks, "Efficient catalytic greenhouse gas-free hydrogen and aldehyde formation from aqueous alcohol solutions," *Energy Environ. Sci*. Jul. 2017, vol. 10, No. 7; pp. 1558-1562.

A. R. Mouat, T. L. Lohr, E. C. Wegener, J. T. Miller, M. Delferro, P. C. Stair, T. J. Marks, "Reactivity of a Carbon-Supported Single-Site Molybdenum Dioxo Catalyst for Biodiesel Synthesis," *ACS Catalysis* Jun. 2016; pp. 6762-6769.

S. Liu, J. Li, T. Jurca, P. C. Stair, T. L. Lohr, T. J. Marks, "Efficient carbon-supported heterogeneous molybdenum-dioxo catalyst for chemoselective reductive carbonyl coupling," *Catalysis Science & Technology* Jul. 2017; pp. 2165-2169.

J. Li, S. Liu, T. L. Lohr, T. J. Marks, "Efficient Chemoselective Reduction of N-Oxides and Sulfoxides Using a Carbon-Supported Molybdenum-Dioxo Catalyst and Alcohol," *ChemCatChem* Nov. 2019; pp. 4139-4146.

Kandari et al., "Catalytic Hydrogenation Reactions on Molybdenum Oxide," *Modern Research in Catalysis* Jan. 6, 2015, vol. 4; pp. 36-42.

Kratish, Yosi, et al. "Polyethylene Terephthalate Deconstruction Catalyzed by a Carbon-Supported Single-Site Molybdenum-Dioxo Complex." Angewandte Chemie International Edition 59.45 (2020): 19857-19861.

Kratish, Yosi, and Tobin J. Marks. "Efficient Polyester Hydrogenolytic Deconstruction via Tandem Catalysis." Angewandte Chemie International Edition 61.9 (2022): e202112576.

(Continued)

*Primary Examiner* — Karuna P Reddy
(74) *Attorney, Agent, or Firm* — Bell & Manning, LLC

(57) ABSTRACT

Provided are methods for depolymerizing polyesters, e.g., PET, PBT, and PEN. In embodiments, a method for depolymerizing a polyester comprises combining a polyester comprising a plurality of ester linking groups (R'C(O)OR), a metal triflate catalyst, and a hydrogenation catalyst, under conditions to cleave a C—O bond in an alkoxy group (OR) of an ester linking group of the plurality of ester linking groups.

3 Claims, 6 Drawing Sheets

(56) References Cited

OTHER PUBLICATIONS

S. Westhues, J. Idel and J. Klankermayer, "Molecular catalyst systems as key enablers for tailored polyesters and polycarbonate recycling concepts," *Sci. Adv.*, Aug. 10, 2018, 4, eaat9669 (pp. 1-8).
J. A. Fuentes, S. M. Smith, M. T. Scharbert, I. Carpenter, D. B. Cordes, A. M. Z. Slawin and M. L. Clarke, "On the Functional Group Tolerance of Ester Hydrogenation and Polyester Depolymerisation Catalysed by Ruthenium Complexes of Tridentate Aminophosphine Ligands," *Chem. Eur. J.*, 2015, 21, 10851-10860.
E. M. Krall, T. W. Klein, R. J. Andersen, A. J. Nett, R. W. Glasgow, D. S. Reader, B. C. Dauphinais, S. P. Mc Ilrath, A. A. Fischer, M. J. Carney, D. J. Hudson and N. J. Robertson, "Controlled hydrogenative depolymerization of polyesters and polycarbonates catalyzed by ruthenium (ii) PNN pincer complexes," *Chem. Commun.*, May 18, 2014, vol. 50, No. 38, 4884-4887.
Y. Kratish, T. Nakamuro, Y. Liu, J. Li, I. Tomotsuka, K. Harano, E. Nakamura and T. J. Marks, "Synthesis and Characterization of Well-Defined Carbon Nanohorn-Supported Molybdenum Dioxo Catalyst by SMART-EM Imaging. Surface Structure at the Atomic Level," *Bull. Chem. Soc. Jpn.*, 2020, 94, 427-432.

* cited by examiner

Control reaction for step a

1-$d_4$ 2-$d_1$ + 2 1

Control reactions for steps c and d $H_2C=CH_2$ GC + 2 3 2 + $H_3C-CH_3$ GC

POLYESTER HYDROGENOLYTIC DECONSTRUCTION VIA TANDEM CATALYSIS

CROSS-REFERENCE TO RELATED APPLICATIONS

The present application claims priority to U.S. provisional patent application No. 63/271,311 that was filed Oct. 25, 2021, the entire contents of which are incorporated herein by reference.

REFERENCE TO GOVERNMENT RIGHTS

This invention was made with government support under DE FG02-03ER15457 awarded by the U.S. DOE. The government has certain rights in the invention.

BACKGROUND

Over the last two decades, the rapid increase in plastic-based materials consumption has generated unimaginable amounts of waste plastic with severe worldwide environmental consequences. In 2018, 395 million tonnes of plastics were produced annually, and this quantity is expected to triple by 2050. Moreover, since over 90% of these plastics are derived from virgin fossil feedstocks, their impact on finite natural resources is also a concern. If a traditional linear economic model is maintained in which plastics are discarded after use, by 2050, the ocean will contain more plastics than fish, and plastics production will consume ~20% of the global petroleum production. To avoid such scenarios, a circular economy in which waste plastics are recycled and repurposed is urgently needed. Reusing plastics reduces the production and energy cost of extraction and processing virgin materials since recycled materials have already undergone refinement and processing. Thus, plastics production from recycled material consumes only ⅔ the energy required to manufacture it from raw materials. In 2015, the potential total energy savings from recovering and recycling plastic packaging (PET, HDPE, and PP) in the US was estimated to be 81.5 trillion Btu, equivalent to ~2 million households' annual electricity use. The greenhouse gas savings were estimated at ~2.4 million tonnes of $CO_2$, equivalent to eliminating 500,000 passenger vehicles. According to a recent US EPA report, one tonne of recycled plastic saves 5,774 kWh of energy, 98 million BTU's of energy, 16.3 barrels of oil, and 30 cubic yards of landfill space. A tonne of PET containers made with recycled plastic conserves about 7,200 kWh of energy and reduces $CO_2$ emissions by 5.1 tonnes. However, despite the energetic and environmental appeal of recycling, a significant fraction of plastics is still sent to landfills or incinerators. As a result, an annual economic loss of $80-120 billion is estimated from the millions of tonnes of plastics currently not recycled.

Polyesters such as polyethylene terephthalate (PET), poly butylene terephthalate (PBT), and polyethylene naphthalate (PEN) are among the most consumed plastic materials worldwide, used extensively in the food, automotive, clothing, construction, and electronics industries, having a multi-billion-dollar market, and as a result, a rising need for recycling. Although globally, PET is the most recycled plastic, only 7% is currently recycled bottle-to-bottle.

SUMMARY

Provided are methods for depolymerizing polyesters, e.g., PET, PBT, and PEN. As shown in FIG. 1, each of these illustrative polyesters is composed of an extended chain of primary alkyl ester groups. As discussed in the Example, below, studies have shown that these types of esters are among the least reactive ester groups. The present disclosure is based, at least in part, on the inventors' findings that product yields for depolymerizing polyesters such as PET, PBT, and PEN using the present methods are unexpectedly high, essentially quantitative even under mild conditions (e.g., 265° C., 24 hours, 1 atm $H_2$).

In embodiments, a method for depolymerizing a polyester comprises combining a polyester comprising a plurality of ester linking groups (R'C(O)OR), a metal triflate catalyst, and a hydrogenation catalyst, under conditions to cleave a C—O bond in an alkoxy group (OR) of an ester linking group of the plurality of ester linking groups.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Figure 1:
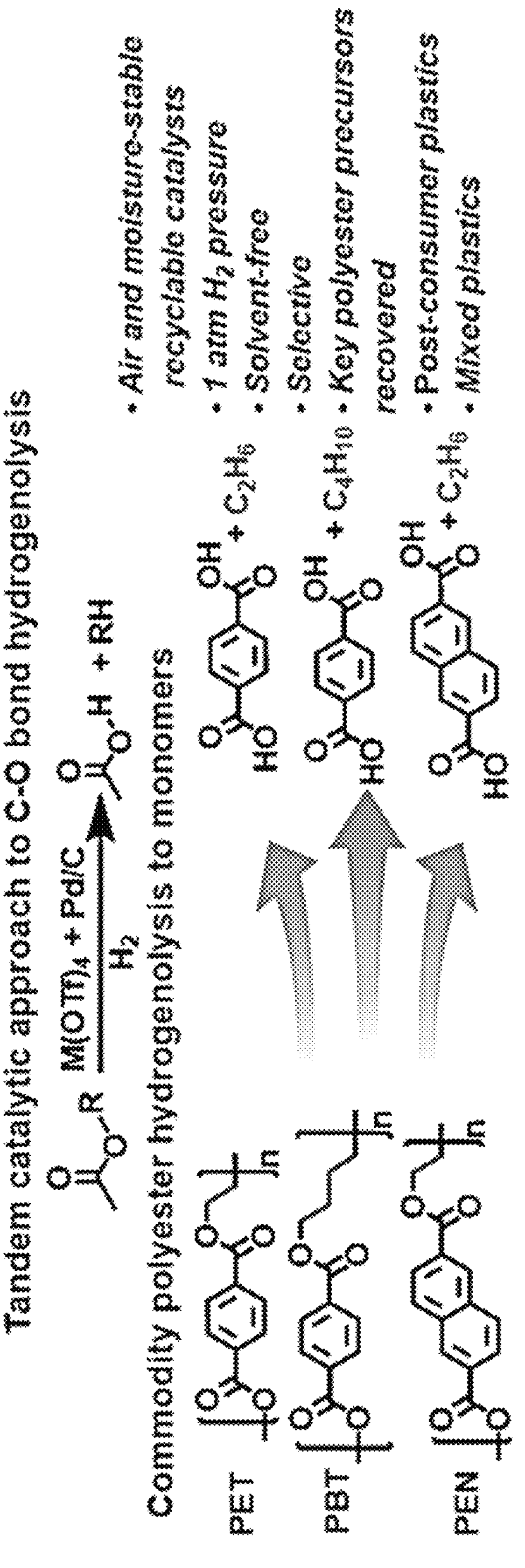
FIG. 1 summarizes the approach to polyester chemical recycling used in embodiments of the present methods.

Provided are methods for depolymerizing polyesters. The methods involve combining a polyester, two different types of catalysts, and optionally, hydrogen ($H_2$) under conditions to induce hydrogenolysis of ester groups in the polyester, thereby providing monomers of the polyester. More specifically, a first catalyst can induce a retro-hydroalkoxylation reaction in which an alkoxy C—O bond in the polyester is first cleaved, yielding a carboxylic acid and an alkene. A second catalyst can induce hydrogenation of the alkene, yielding an alkane. As noted above, monomer yields from the methods are unexpectedly high. Moreover, mild conditions may be used (e.g., the polyesters' melting/softening temperature: a time of less than 48 hours; low $H_2$ pressures (or even no $H_2$). No solvents (e.g., water, alcohol, glycol, amine, etc.) are required. No other additives (e.g., acids, bases, etc.) are required.

The polyesters to be depolymerized by the present methods are polymers composed of monomers covalently bound into an extended chain via ester linking groups, which may be represented by —R'C(O)OR—, wherein the "—" denotes the covalent bonds to the rest of the polyester. As noted above, the present methods cleave the C—O bond of the alkoxy groups (OR) of these ester linking groups. In embodiments, the carbon of the cleaved C—O bond is a primary carbon. The R of the alkoxy groups may be a linear, branched, or cyclic aliphatic group. The number of carbons in the aliphatic group (whether linear, branched, or cyclic) may be in the range of from 2 to 20. This includes from 2 to 18, from 2 to 16, from 2 to 14, from 2 to 12, from 2 to 10, and from 2 to 8. The aliphatic group may be unsubstituted or substituted. By "substituted," it is meant that one or more bonds to a carbon(s) or hydrogen(s) in the unsubstituted aliphatic group are replaced by a bond to non-hydrogen and non-carbon atoms. Unsubstituted aliphatic groups also encompass aliphatic groups in which one or more bonds to a carbon(s) or hydrogen(s) are replaced by a bond to a different type of unsubstituted aliphatic group, e.g., a cyclohexyl group having a carbon bound to a methyl group. The aliphatic group may be saturated. In embodiments, the aliphatic group is a linear, saturated, unsubstituted aliphatic group, e.g., ethyl, propyl, butyl, pentyl, hexyl, etc. Other "R" groups are discussed below with respect to the organic diols and polyesters of Formula I. The R' of the ester linking groups is described below with respect to the dicarboxylic acids and the Ar groups of the polyesters of Formula I.

Polyesters to be depolymerized by the present methods may be those which are formed by reacting one or more different types of an organic diol (which may be represented as HOROH) with one or more different types of a dicarboxylic acid (which may be represented as HOOCR'COOH) to provide the ester linking groups noted above. In other words, polyesters which may be depolymerized include those that are the polymerization product of reactants comprising such an organic diol(s) and such a dicarboxylic acid(s). Thus, depending upon the type(s) of organic diol and the type(s) of dicarboxylic acid being used (i.e., depending upon R and R'), a variety of polyesters are encompassed. The polyester may be identified by reference to the organic diol(s) and the dicarboxylic acid(s) used to form the polyester, recognizing that the chemical form of these reactants is slightly modified by the ensuing chemical reaction to provide the ester linking groups.

The primary, monomeric products produced by the methods may comprise these starting dicarboxylic acids, which may be recovered and used in further syntheses. Rather than the starting organic diols, however, the secondary products generally comprise an alkane corresponding to the starting organic diol. This means the organic diol in which the hydroxyl groups are replaced by hydrogens (forming carbon-hydrogen bonds rather than carbon-hydroxyl bonds).

Regarding the dicarboxylic acid, R' in HOOCR'COOH may be an aromatic group or a heterocyclic group. The aromatic group may be substituted or unsubstituted. By "substituted," it is meant that one or more bonds to a carbon(s) or hydrogen(s) in the unsubstituted aromatic group are replaced by a bond to non-hydrogen and non-carbon atoms. Unsubstituted aromatic groups also encompass aromatic groups in which one or more bonds to a carbon(s) or hydrogen(s) are replaced by a bond to an unsubstituted aliphatic group, e.g., an alkyl group. By way of illustration, R' may be an aromatic group comprising one or more benzene rings. If more than one benzene ring is included, they may be connected or fused. Aside from the carboxylic acid groups, these benzene rings may be substituted or unsubstituted. As another illustration, R' may be a heterocyclic group comprising a furan. If R' is or comprises a benzene ring(s), the carboxylic acid groups may be on the same benzene ring or on different benzene rings. If the carboxylic groups are on the same benzene ring, they be in an ortho, meta, or para relationship. If R' is or comprises a heterocyclic group such as a furan, the carboxylic acid groups may be on neighboring or non-neighboring carbons of the ring. As noted above, the primary, monomeric products produced by the methods may comprise these starting dicarboxylic acids. The polyester may be identified by reference to the dicarboxylic acid(s) from which it is formed.

Illustrative dicarboxylic acids include terephthalic acid, naphthalene dicarboxylic acid, 2,5-furan dicarboxylic acid, diphenyldicarboxylic acid, diphenyl ether dicarboxylic acid, diphenylsulfonedicarboxylic acid, and diphenoxyethanedicarboxylic acid. Other illustrative dicarboxylic acids include succinic acid, adipic acid, sebacic acid, azelaic acid, decanedicarboxylic acid, and cyclohexanedicarboxylic acid.

Regarding the organic diol, this compound may be an aliphatic diol in which R in HOROH may be a linear, branched, or cyclic aliphatic group. The number of carbons in the aliphatic group (whether linear, branched, or cyclic) may be in the range of from 2 to 20. This includes from 2 to 18, from 2 to 16, from 2 to 14, from 2 to 12, from 2 to 10, and from 2 to 8. The aliphatic group may be saturated. The aliphatic diol may be substituted or unsubstituted, with meanings analogous to that described above with respect to the alkoxy groups. The hydroxyl groups may be on the same carbon atom, adjacent carbon atoms, or non-adjacent carbon atoms. As noted above, secondary products produced by the methods generally may comprise an alkane corresponding to these starting organic diols. The polyester may be identified by reference to the organic diol(s) from which it is formed.

Illustrative organic diols include ethylene glycol, trimethylene glycol, 1,2-propanediol, tetramethylene glycol, neopentyl glycol, hexamethylene glycol, decanemethylene glycol, dodecamethylene glycol, 1,4-cyclohexanedimethanol, diethylene glycol, triethylene glycol, tetraethylene glycol, dipropylene glycol, tripropylene glycol, tetrapropylene glycol, di(tetramethylene)glycol, and tri(tetramethylene)glycol.

In embodiments, the polyester to be depolymerized in the present methods has Formula I, $-[OC(O)ArC(O)OR]_n-$, wherein the "—" denotes the covalent bonds to the rest of the polyester. In this formula, Ar may be selected from benzene: a heterocycle (e.g., furan): a fused ring structure comprising benzene (e.g., naphthalene), a heterocycle (e.g., furan), or both (e.g., dibenzofuran); and a connected ring structure comprising benzene, a heterocycle, or both. The description above with respect to the dicarboxylic acid groups (e.g., unsubstituted, substituted, positioning of the dicarboxylic acid groups, etc.) also applies to "Ar" in Formula I. In Formula I, R may be selected from a linear aliphatic group, a branched aliphatic group, a cyclic aliphatic group, and a substituted diol. The number of carbons in the aliphatic group (whether linear, branched, or cyclic) and the number of carbons in the substituted diol may be in the range of from 2 to 20. This includes from 2 to 18, from 2 to 16, from 2 to 14, from 2 to 12, from 2 to 10, and from 2 to 8. The description above with respect to the organic diol (e.g., unsubstituted, substituted, saturation, positioning of the hydroxyl groups, etc.) also applies to "R" in Formula I. In embodiments, however, R is a linear, saturated, unsubstituted aliphatic group, e.g., ethyl, propyl, butyl, pentyl, hexyl, etc. The value of n may be in the range of from 5 to 10,000. This includes from 5 to 5,000, from 5 to 1,000, from 5 to 500, from 5 to 100, from 100 to 10,000, and from 100 to 1,000. Formula I encompasses homopolymers as well as copolymers, in which different types of Ar groups, different types of R groups, or both are used to form the polyester.

Illustrative polyesters to be depolymerized in the methods include polyethylene terephthalate (PET), poly butylene terephthalate (PBT), polytrimethylene terephthalate (PTT), polyethylene naphthalate (PEN), polyethylene 2,5-furandicarboxylate (PEF), polyethylene terephthalate glycol-modified (PETG), and poly(1,4-cyclohexylenedimethylene terephthalate) (PCT). Other illustrative polyesters include polyethylene adipate (PEA) and poly butylene succinate (PBS). Other illustrative polyesters include polycaprolactone (PCL), polyglycolic acid (PGA), polylactic acid (PLA), polyhydroxyalkanoate (PHA), poly hydroxy butyrate (PHB), poly(3-hydroxy butyrate-co-3-hydroxyvalerate) (PHBV), and vectran. The methods may be used to depolymerize a single type of polyester or multiple, different types of polyesters.

In embodiments, the polyester is PET and the methods depolymerize PET to produce terephthalic acid and ethane. In embodiments, the polyester is PBT and the methods depolymerize PBT to produce terephthalic acid and butane. In embodiments, the polyester is PEN and the methods depolymerize PEN to produce naphthalene dicarboxylic acid and ethane.

The conditions being used in the present methods include the temperature and period of time. These parameters may be adjusted in order to promote depolymerization and thus, to achieve a desired (e.g., maximum) yield of monomer, e.g., the starting dicarboxylic acid(s). However, the temperature is generally near the melting temperature of the polyester. Thus, the specific temperature used depends upon the polyester. For PET, for example, the temperature may be at least 240° C., at least 250° C., at least 260° C., at least 270° C., or in a range of from 200° C. to 600° C., from 200° C. to 500° C., or from 200° C. to 400° C.

The period of time also depends upon the polyester, but illustrative times include at least 1 hour, at least 2 hours, at least 4 hours, at least 8 hours, at least 12 hours, at least 18 hours, at least 24 hours, at least 36 hours, at least 48 hours, or in a range of from 1 hours to 48 hours, from 1 hours to 36 hours.

The conditions under which the present methods are carried out may include whether or not a hydrogen ($H_2$) atmosphere is being used. In embodiments, no $H_2$ is used. If $H_2$ is used, other gases (e.g., inert gases) may be included. If used, the $H_2$ pressure may be adjusted in order to achieve a desired (e.g., maximum) yield of monomer. However, high $H_2$ pressures are not required. The $H_2$ pressure may be no more than 50 atm, no more than 25 atm, no more than 10 atm. The $H_2$ pressure may be in a range of from 1 atm to 10 atm, from 1 atm to 100 atm, or from 1 atm to 500 atm. The method is generally carried out without using any solvent. As such, the method may be referred to as being "solvent-free" and the like.

The present methods make use of two different types of catalysts. A first type of catalyst which is used is a homogeneous metal triflate catalyst. This catalyst may be represented by the formula $M(OTf)_n$. The value of n depends upon the selected metal M, but generally, the highest oxidation state (+n) is used. Illustrative metals include transition metals such as Hf, Ce, Cu, Ga, Ag, Bi, Fe, Al, Zr, Mo, W, Nb, or Ta. In embodiments, the first type of catalyst is $Hf(OTf)_4$. A second type of catalyst which is used is a hydrogenation catalyst. The hydrogenation catalyst comprises or consists of a metal. The hydrogenation catalyst may be homogeneous hydrogenation catalyst or a heterogenous hydrogenation catalyst. Heterogenous hydrogenation catalysts may also be referred to as supported metal catalysts. The support is generally an oxygen-containing or an oxygen-functionalized material, e.g., a metal oxide support (silica, alumina) or a carbonaceous support such as activated carbon. The metal of the heterogenous metal catalyst may also be a transition metal such as Pd, Pt, Ni, Ru, Rh, or Ir. In embodiments, the heterogeneous hydrogenation catalyst is Pd/C. As noted above, the present methods use a combination of both of types of catalysts.

The conditions under which the present methods are carried out may include the relative amounts of the polyester, the first type of catalyst, and the second type of catalyst being used. These relative amounts may also be adjusted in order promote depolymerization and thus, to achieve a desired (e.g., maximum) yield of monomer. The relative amounts may be reported as a molar ratio of (ester groups):(metal of homogeneous catalyst):(metal of hydrogenation catalyst). In this molar ratio, the ester groups may range from 1 to 10000 (or from 100 to 5000 or from 250 to 1500), the metal of the homogeneous catalyst may range from 0.001 to 100 (or from 0.01 to 50 or from 0.1 to 10), and the metal of the hydrogenation catalyst may range from 0.00001 to 100 (or from 0.0001 to 50 or from 0.001 to 10). If more than one type of polyester is being used, the amount refers to the total amount of ester groups.

When combined for carrying out the present methods, the polyester, the first type of catalyst, and the second type of catalyst may be considered to form a reaction mixture comprising each of these components. As noted above, the reaction mixture need not comprise any solvents or other additives. Thus, the reaction mixture may be characterized as being free of a solvent and free of an additive (other than $H_2$, if used).

In embodiments, the reaction mixture consists of the polyester, the first type of catalyst, and the second type of catalyst. In such embodiments, the polyester may be a single type of polyester; multiple, different types of polyesters; or a blend of the polyester with one or more non-polyester polymers (e.g., a polyolefin). These embodiments do not preclude the use of a $H_2$ atmosphere as described above. These embodiments also do not preclude the presence of components or impurities which may be inherently present (generally in relatively small amounts) due to the particular synthetic technique used to form the polyester/non-polyester polymers.

Prior to use in the methods, the catalysts may be dried by heating, optionally in vacuum as described in the Example, below. Similarly, the polyesters may be dried prior to use as described in the Example, below.

The method may be carried out using a variety types of reactor systems, including batch reactor systems, semi-batch reactor systems, and continuous flow reactor systems.

The method may further comprise recovering and/or recycling the catalysts from the reaction mixture which, after the depolymerization, includes the monomers and possibly, unreacted polyester and/or other depolymerized polyester fragments. No solvent is required for recovery of the catalysts. The recovered catalysts may be used to carry out the method one or more additional times (i.e., they may be recycled). Similarly, the monomers may be recovered and used for any desired purpose, including synthesizing new polymer, including a new polyester. Recovery of the monomers may be by vaporization or sublimation.

The method may be characterized by a yield of monomer, including yield of the starting dicarboxylic acid. The yield is reported as (weight of monomers)/(starting weight of polyester)*100%. The yield may be determined using $^1H$ NMR as described in the Example below: The yield may be an initial yield obtained by using fresh (i.e., unused) catalyst. The initial yield may be at least 70%, at least 75%, at least 80%, at least 85%, at least 90%, at least 95%, at least 98%, or in a range of from 70% to 100%. The yield may be a yield obtained by using recovered catalyst which has been used one or more times (e.g., 1, 2, 3, 4, etc.). The yield from a recycled/recovered catalyst may be within ±20%, ±10%, ±5%, or ±2% of the initial yield. Any of the yield values in this paragraph may refer to a specific polyester (e.g., PET/PBT/PEN), a specific monomer (e.g., terephthalic acid/naphthalene dicarboxylic acid), a specific catalyst system (e.g., $Hf(OTf)_4$, Pd/C) and the method carried out at a specific temperature (e.g., 265° C.), for a specific time (e.g., 24 hours), under a specific atmosphere (e.g., 1 atm $H_2$), and using a specific (ester):(metal of homogeneous catalyst):(metal of hydrogenation catalyst molar ratio) (e.g., 400:6:1).

As noted above, the polyester to be depolymerized by the present method may be provided in a blend with non-polyester polymers, e.g., a polyolefin. The present methods may be used to depolymerize the polyester while leaving the other polymer unchanged. Thus, the present methods allow for separation of a polyester from such a blend. In the method, the polyester is deconstructed/depolymerized while leaving the non-polyester polymer intact. The term "intact" does not necessarily mean perfectly intact as a minor amount of the non-polyester polymer may be decomposed.

EXAMPLE

Introduction

Although esters are among the least reactive carbonyl functional groups (second to amides), some cleavage methodologies have been developed. Existing schemes for PET deconstruction include the use of a homogeneous Ru ester hydrogenation catalyst. (S. Westhues, et al., *Sci. Adv.*, 2018, 4, eaat9669; J. A. Fuentes, et al., *Chem. Eur. J.*, 2015, 21, 10851-10860; E. M. Krall, et al., *Chem. Commun.*, 2014, 50, 4884-4887.) $H_2$ is a cost-effective PET deconstruction agent, but reliance on complex and expensive ligands and expensive/potentially toxic homogeneous Ru catalysts, extremely high $H_2$ pressures (54-100 atm), long reaction times (16-48 h), diol production which requires subsequent oxidative steps to regenerate TPA, and recovering the diol products from the reaction medium is not desirable. As another example, carbon-supported single-site Mo-dioxo catalyst, $C/MoO_2$ has been shown to catalyze PET deconstruction. (Y. Kratish, et al., Angew. *Chem. Int. Ed.*, 2020, 59, 19857-19861; Y. Kratish, et al., *Bull. Chem. Soc. Jpn.*, 2020, 94, 427-432.) However, reaction rates were slow.

A homogeneous metal triflate catalyst and a heterogeneous hydrogenation catalyst have been used to effect C—O bond hydrogenolysis in some small-molecule esters. (T. L. Lohr, et al., *Energy Environ. Sci.*, 2016, 9, 550-564; T. L. Lohr, et al., *Acc. Chem. Res.*, 2016, 49, 824-834; T. L. Lohr, et al., *ACS Catal.*, 2015, 5, 3675-3679.) These studies established that the alkoxyl group of the ester significantly influences the ester cleavage rate, with activity scaling as 3° (tertiary)>2° (secondary)>>1° (primary). Primary alkyl esters, e.g., methyl octanoate, demonstrated extremely poor catalytic activity and selectivity. Steric hindrance effects in the ester were also shown to suppress catalytic activity.

The vast majority of large-volume commodity polyesters contain primary ester linkages in the form of thousands of α,ω-diolyl repeating blocks such as ethylene glycolyl. Based on the small-molecule studies described above and prior to the present application, it was thought that both the type (primary), number (many thousands), and close proximity of the ester moieties in polyester structures could introduce an insurmountable barrier to the consecutive tandem C—O bond hydrogenolysis of PET and related polyesters.

However, the present Example shows that the $Hf(OTf)_4$ and Pd/C tandem catalytic system results in surprisingly efficient depolymerization of commodity polyester plastics such as PET, PBT, and PEN in high recovered yields (near quantitative conversion) under mild conditions (near the melting temperatures of these polymers, under 1 atm of $H_2$, and in the absence of solvent).

EXPERIMENTAL

Materials and Methods

All manipulations of reagents were carried out in oven-dried glass reaction vessels. Reactions of esters and diesters were carried out in cylindrical 100 mL Schlenk vessels under 1 atm $H_2$ with heating supplied by an oil bath. Reactions of polyesters were carried out in cylindrical reactors (25×200 mm tubes), under 1 $H_2$ atmosphere equipped with rubber septa, and a Sigma-Aldrich $H_2$ gas delivery balloon, with heating supplied by a dry bath metal block. Ethylmethyl terephthalate, poly butylene terephthalate (PBT) pellets, polyethylene naphthalate (PEN) pellets, Pd/C (10 wt. %) were purchased from Sigma-Aldrich. PET powder was purchased from Goodfellow Inc. with a specified particle size of 300 μm and containing 1 ppm of acetaldehyde. $Hf(OTf)_4$ was purchased from Fisher Scientific and dried at 150° C. overnight under vacuum. Ethyleneglycol bis(dimethylterephthalate) (1) was synthesized according to a known procedure. (A. Miyake, Journal of Polymer Science, 1959, 38, 479-495.) For the synthesis of the deuterated analog, de-ethylene glycol bis(dimethyl terephthalate) (1-$d_4$) $d_4$-ethylene glycol ($HOCD_2CD_2OH$) was used instead of ethylene glycol-$H_6$.

Physical and Analytical Measurements

NMR spectra were recorded on a Varian Bruker Avance III HD system equipped with a TXO Prodigy probe (500 MHz) spectrometer. Chemical shifts (δ) for $^1H$ were referenced to internal solvent. The headspace gas in the reactors was first collected using a 10 mL airtight syringe and then manually injected into an Agilent 7890A gas chromatograph equipped with a flame ionization detector (FID). The gaseous products were separated on an Agilent PLOT-Q capillary column and then analyzed by FID. He was used as the carrier gas in GC.

General Procedure

A dry cylindrical glass reactor (Schlenk or vertical tube) was charged in the glove box with an ester or polyester, $Hf(OTf)_4$ and Pd/C in an ester:Hf:Pd ratio of 400:6:1. The reactor was then purged with Ar five times, charged with $H_2$, and heated while stirring. During the reaction, the products sublimed from the reaction zone and crystallized near the top of the reaction tube. After the reaction was complete, DMSO-$d_6$ or DCM-$d_2$ and mesitylene as an internal standard were added and 0.5 mL of the reaction mixture solution was charged into an NMR tube.

Results and Discussion

Heating neat 1 in a sealed 100 mL Schlenk flask in the presence of both $Hf(OTf)_4$ and Pd/C catalysts and 1 atm $H_2$ at 180° C. using an ester:Hf:Pd mole ratio of 400:6:1 effected a quantitative conversion of 1 (97%) to the monomeric products, carboxylic acid 2 and partially hydrogenolyzed ethyl ester 3 in 72% and 24% yields, respectively, and ethane as the only gaseous product (Eq. 1, Table 1, Entry 1).

Table 1 is shown below and details about each entry follow after Table 1. Note that the products readily sublime from the hot reaction vessel and crystalline 2 and 3 collect in the cold portion of the reactor. The catalyst loadings can be decreased to an ester:Hf:Pd mol ratio of 1200:6:1 with slightly lower conversion under similar conditions (80%, Table 1, Entry 2). Omitting either $Hf(OTf)_4$ or Pd/C under identical reaction conditions yields only traces of 2 (<5%; Table 1, Entries 3-4), showing that the tandem combination allows for efficient C—O hydrogenolysis. Monitoring neat diester 1 consumption as a function of time revealed an almost quantitative conversion after 8 h (93%, Table 1, Entry 5) and zero-order dependence on ester concentration.

(1)

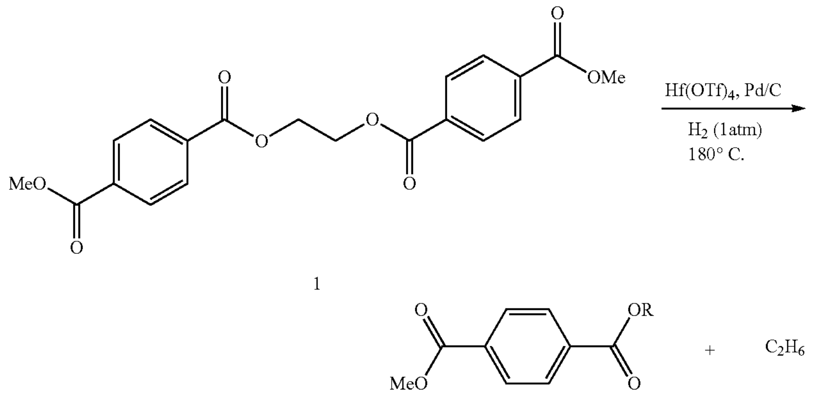

1

R=H (2), 72%

R=Et (3), 24%

TABLE 1

$Hf(OTf)_4$ + Pd/C catalyzed polyester hydrogenolysis data.

| Entry | Diester | Ester:Hf:Pd | Conv.(%) | Yield (%) |
|---|---|---|---|---|
| 1 | 1 | 400:6:1 | 97 | 96 (2 + 3) |
| 2 | 1 [a] | 1200:6:1 | 80 | 76 (2 + 3) |
| 3 | 1 | 400:0:1 | 0 | 0 |
| 4 | 1 | 400:6:0 | 8 | <5 (2) |
| 5 | 1 [b] | 400:6:1 | 93 | 89 (2 + 3) |
| 6 | PET (commercial) [c, d] | 400:6:1 | N.D. | 98% (5) |
| 7 | PET (bottle) [c, d] | 400:6:1 | N.D. | 97% (5) |
| 8 | PET (shirt) [c, d] | 400:6:1 | N.D. | 96% (5) |
| 9 | PET (pillow) [c, d] | 400:6:1 | N.D. | 95% (5) |
| 10 | PET + PP [c, d] | 400:6:1 | N.D. | 81% (5) |
| 11 | PBT (commercial) [c, d] | 400:6:1 | N.D. | 99% (5) |
| 12 | PBT (tube fitting) [c, d] | 400:6:1 | N.D. | 93% (5) |
| 13 | PET + PBT [c, d] | 400:6:1 | N.D. | 99% (5) |
| 14 | PEN (commercial) [c, e] | 400:20:3.3 | N.D. | 62% (6) |
| 15 | PET [c, f] | 40:1 | N.D. | 87% (5) |
| 16 | PET [c, g] | 100:1 | N.D. | 85% (5) |

Conditions: 100 mL Schleck flask, solventless, 180° C., 24 h, 1 atm $H_2$. Conversions and ester yields determined by $^1H$ NMR using mesitylene internal standard; products confirmed by $^{13}C$ NMR.

[a] 48 h.

[b] 8 h.

[c] Reaction tube (25 x 200 mm) connected to gas delivery balloon.

[d] 265° C.

[e] 280° C.

[f] 24 h.

[g] 96 h.

Figure 4A:
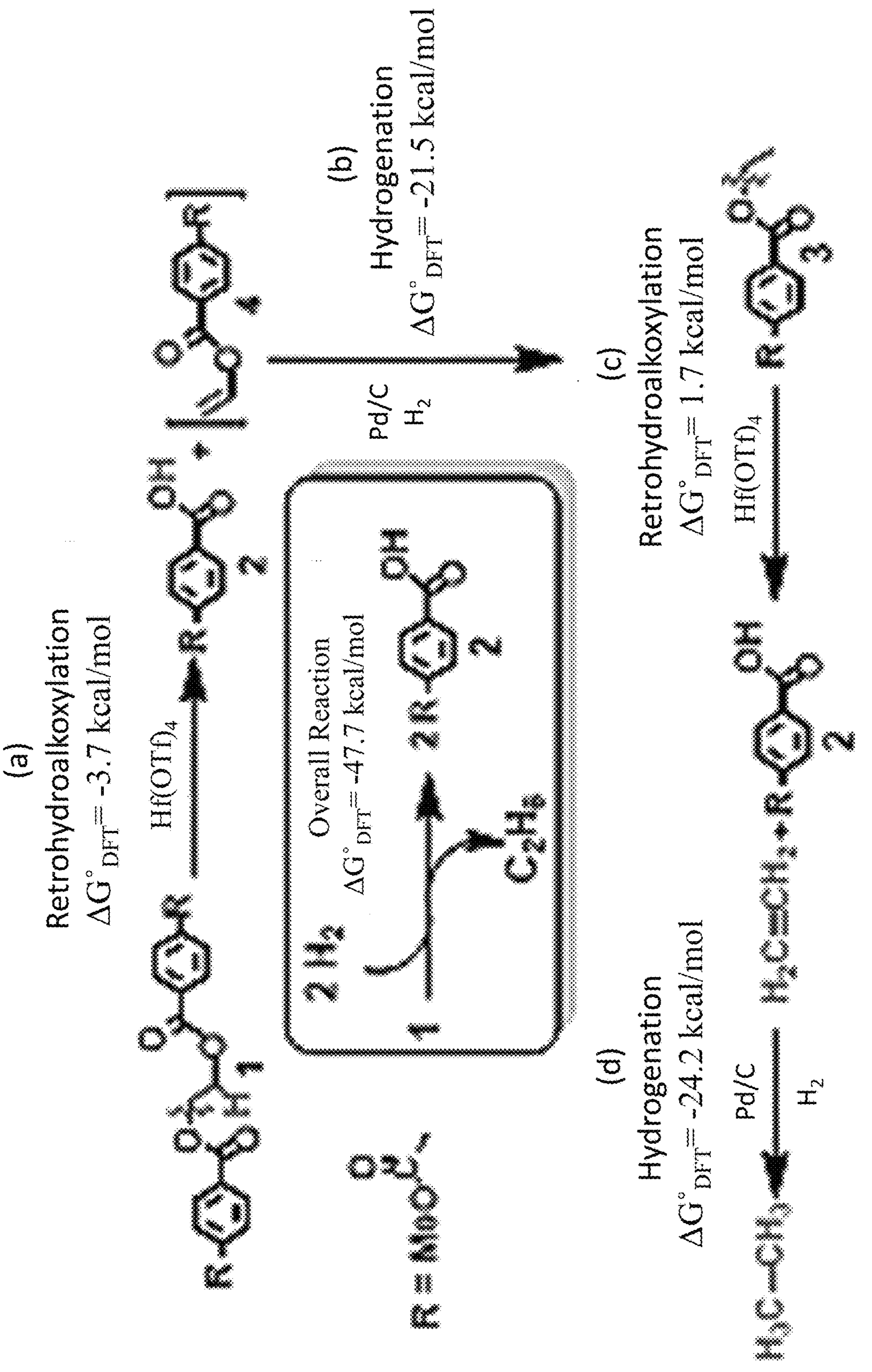
FIG. 4A shows the proposed pathway for the hydrogenolysis of diester 1 using embodiments of the present methods, supported by DFT calculations and control experiments. The control experiments are shown in FIGS. 4B and 4C.

From the above results, the following pathway for diester 1 hydrogenolysis is proposed (FIG. 4A). Overall, hydrogenolysis of 1 to two carboxylic acid products (2) and ethane is highly exergonic (ΔG=−47.7 kcal/mol). In the first step, 1 undergoes a retro-hydroalkoxylation in which the alkoxy C—O bond is cleaved, and the H atom from the glycol moiety migrates to the acyl oxygen, affording carboxylic acid 2 and vinyl ester 4 (FIG. 4A, step a). When the deuterated diester analog, 1-$d_4$, is reacted in the presence of $H_2$, the corresponding deuterated carboxylic acid, MeO(O)C—$C_6H_4$—COOD(2-$d_1$), and 2 are formed as assayed by 1H and 2H NMR, respectively (FIG. 4B, reaction a), supporting the H transfer from the glycol substituent and $H_2$.

Figure 4B:
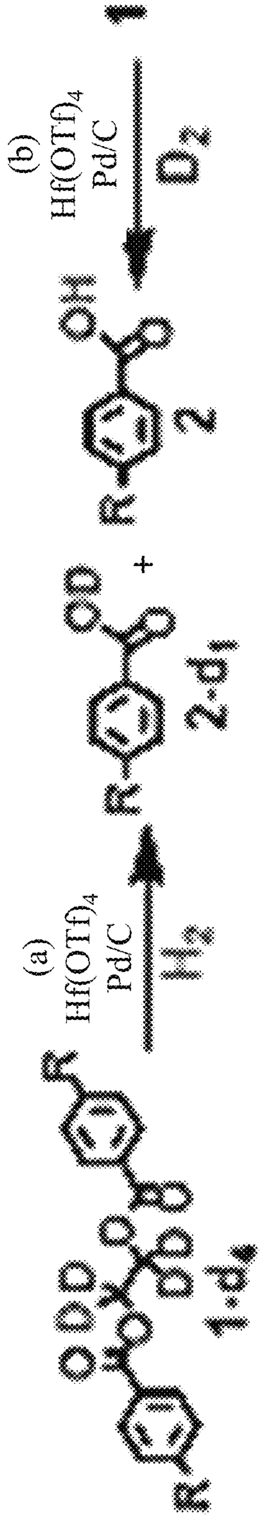
Figure 4C:
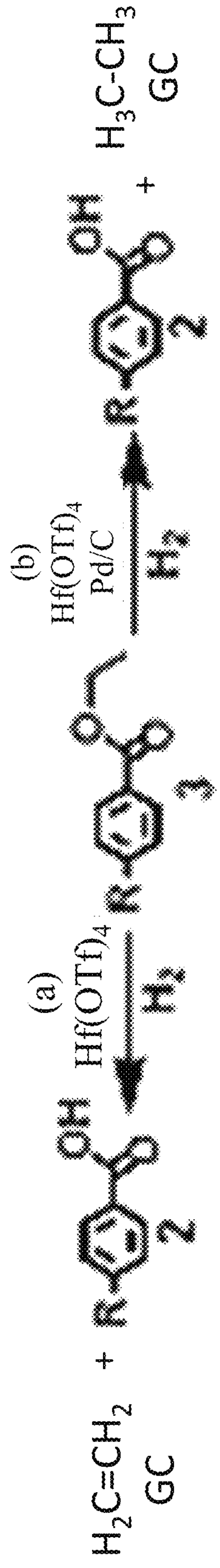

In addition, when 1 is reacted in the presence of $D_2$, 2 and 2-$d_1$ are similarly obtained, verifying that the source of the carboxylic H atoms is the glycol moiety and $H_2$ ($D_2$) (FIG. 4B, reaction b). Step a is computed to be slightly exergonic (ΔG=−3.7 kcal/mol) and, as shown in Table 1, entry 3 does not proceed with $Hf(OTf)_4$ alone. However, coupling in tandem to a significantly exergonic olefin hydrogenation step (ΔG=−21.5 kcal/mol) drives the reaction forward to produce carboxylic acid 2 and ethyl ester 3, which are observed in the NMR (FIG. 4A, step b). Similarly, to step a, 3 undergoes a second retro-hydroalkoxylation to yield 2 and ethylene in a slightly endergonic step (ΔG=1.7 kcal/mol; FIG. 4A, step c). In the final step, ethylene is hydrogenated to ethane in an exergonic step (ΔG=−24.2 kcal/mol; FIG. 4A, step d). Steps c and d are also supported by two independent experiments in which ethylene and 2 are produced from 3 in the presence of $Hf(OTf)_4$ alone (FIG. 4C, reaction a). In the presence of Pd/C, $Hf(OTf)_4$ and $H_2$, 3 is converted to ethane and 2 (FIG. 4C, reaction b).

Figure 2A:
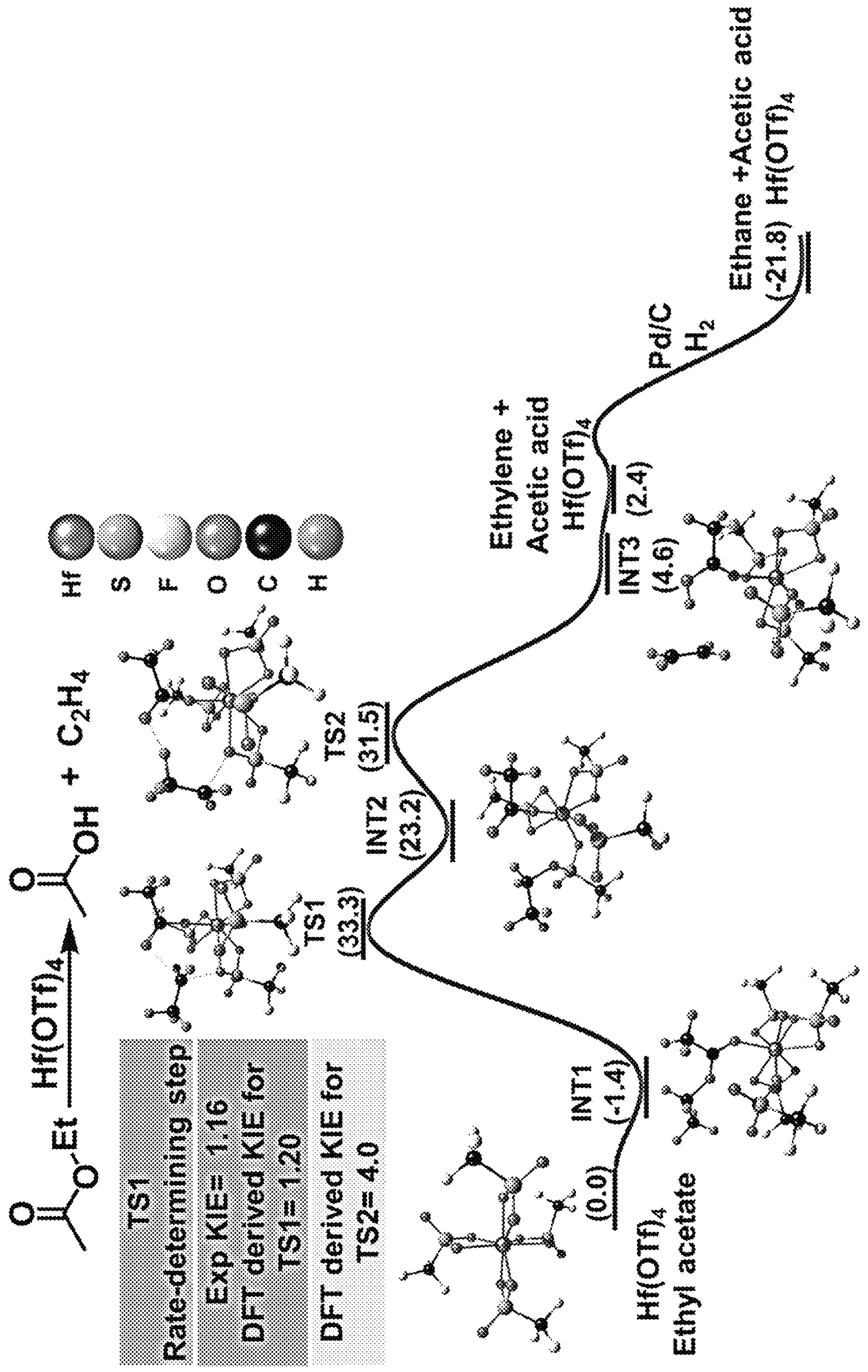
FIG. 2A shows the computed solution-phase Gibbs free energy profile in kcal/mol for the tandem catalytic hydrogenolysis of diester 1, along with experimental and calculated KIE's.
Figure 2B:
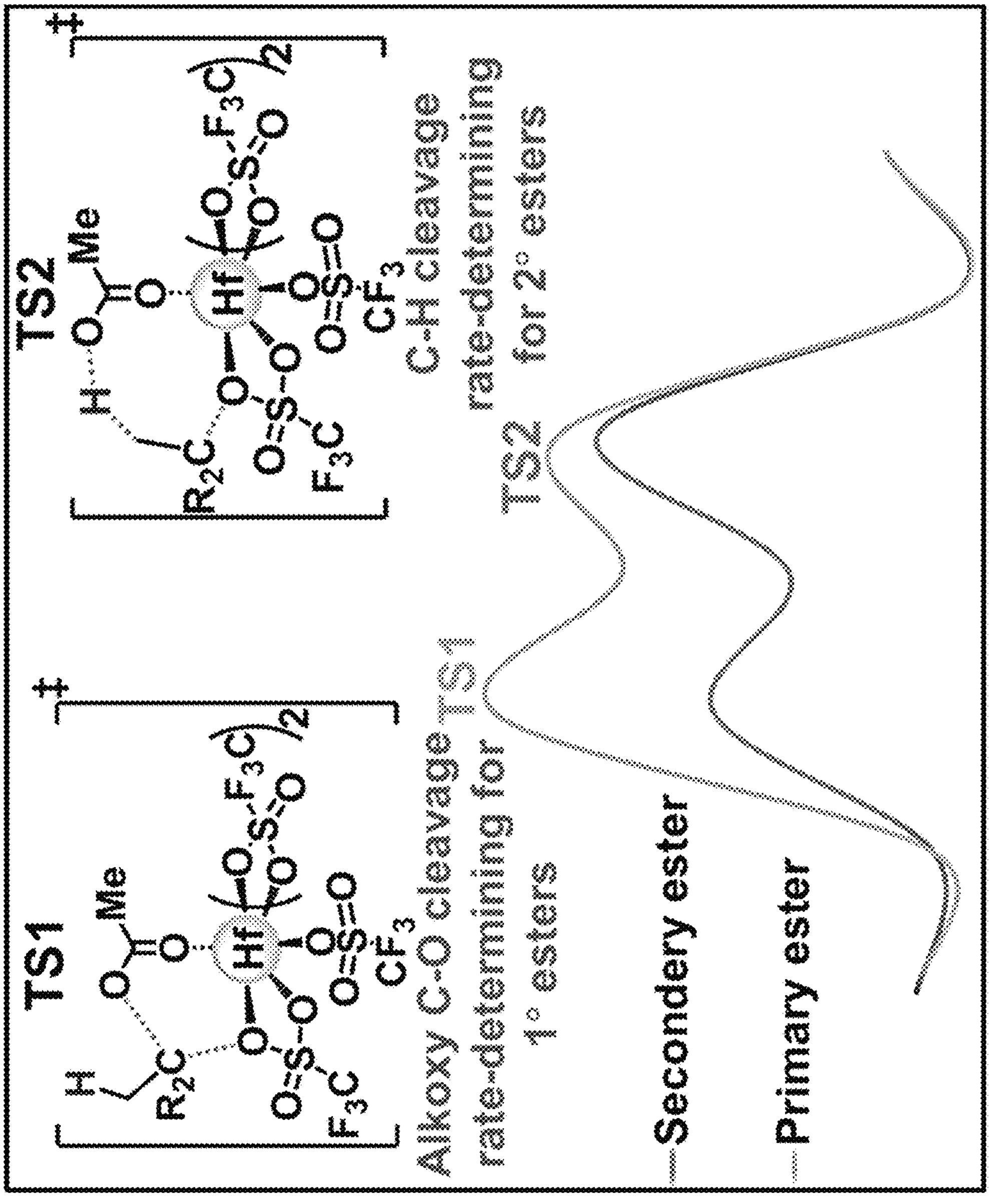
FIG. 2B shows a comparison of the rate-determining steps for primary and secondary ester retro-hydroalkoxylation.

To further probe the reaction mechanism and energetic landscape, a detailed solution-phase Gibbs free energy profile was computed by DFT for the $Hf(OTf)_4$-catalyzed C—O retro-hydroalkoxylation cleavage pathway in an ethyl acetate model for polyesters, yielding ethane and acetic acid (FIGS. 2A, 2B). This profile includes the structures of all intermediates and transition states along the reaction coordinate. All energies are shown with respect to $Hf(OTf)_4$+ ethyl acetate. In the first step, an oxygen atom of a bidentate triflate ligand dissociates to free a Hf coordination site for ethyl acetate binding via the carbonyl oxygen atom yielding INT1. This step is exergonic (ΔG°) by −1.4 kcal/mol and is the most stable intermediate found on the reaction coordinate (catalyst resting state), in agreement with the experimental zero-order rate law dependence on ester concentration. According to the calculations, the binding via the etheric oxygen is less favorable by ~21.2 kcal/mol. In the second step, alkoxy C—O scission yields INT 2 containing a carboxylato group on the Hf ion and an ethoxysulfinyl moiety on the triflate ligand. This step is endoergic by ~24.6 kcal/mol with a barrier of $\Delta G^{\ddagger}$=34.7 kcal/mol (TS1) and is the rate-limiting transition state. This step is followed by a proton transfer from the ethoxysulfinyl group to the carboxylato group on the Hf ion, producing a Hf-acetic acid adduct and ethylene (INT3). This step is exergonic by ~18.6 kcal/mol with a computed barrier of $\Delta G^{\ddagger}$=~8.3 kcal/mol (TS2). Next, ethylene and acetic acid dissociate from the Hf complex in a slightly exergonic step, regenerating the starting $Hf(OTf)_4$ complex ($\Delta G^{\circ}$=2.2 kcal/mol). The overall retro-hydroalkoxylation reaction of ethyl acetate to ethylene+acetic acid is slightly endoergic by $\Delta G^{\circ}$=+2.4 kcal/mol, similar to the real ethyl ester 3 retro-hydroalkoxylation step, ($\Delta G^{\circ}$=+1.7 kcal/mol, FIG. 4A, step c) verifying that ethyl acetate is an appropriate model. In the final step, ethylene is hydrogenated in a significantly exergonic step ($\Delta G^{\circ}$=−24.2 kcal/mol), driving the overall reaction to completion.

According to the computed mechanism, the rate-limiting transition state is the alkoxy C—O cleavage (TS1). Note that TS2, in which a C—H bond is cleaved, is slightly lower in energy and therefore is not expected to be rate-limiting. These steps should have noticeably different kinetic isotope effects (KIE), with DFT predicting a secondary KIE of ~1.20 for TS1 and a primary KIE of ~4.0 for TS2 (FIG. 2A). Experimental kinetic studies were next conducted, and the measured KIE≈1.16 supports that TS1 is indeed the rate-determining transition state. The experimental KIE for cyclohexyl acetate, a secondary ester, was found to be 6.5, in excellent agreement with the DFT-derived KIE≈6.3. Comparison of the ethyl acetate and cyclohexyl acetate reaction coordinates shows that both reactions follow a similar pathway, having alkoxy C—O (TS1) and C—H bond (TS2) cleavage steps. However, unlike 1° esters where TS1 is rate-determining (vide supra), for 2° esters, such as cyclohexyl acetate, TS2 is the rate-determining step (FIG. 2B). Another clear difference is that the overall barrier for 1° esters is higher by ~7 kcal/mol than for 2° esters.

Next, the tandem hydrogenolytic depolymerization of the large-volume polyester plastics, PET, PBT, and PEN was investigated. The reaction temperature was raised to near the corresponding polymer's melting point. Surprisingly, under these conditions, commercial PET is converted selectively and in essentially quantitative yield (98%) to its starting monomer, TPA (5; Table 1 Entry 6, FIG. 3A), and ethane. Monitoring the headspace gases during the reaction by NMR or gas chromatography (GC) reveals the presence of ethane as the major C2 product and ethylene as an intermediate, supporting the ethyl ester retro-hydroalkoxylation step in the proposed mechanism (FIG. 4A step c, and FIG. 2A). Without a catalyst, <10% yield of 5 is obtained-possibly via partial PET thermolysis. Using $Hf(OTf)_4$ alone yields 5 in 26% yield, supporting the assertion that $Hf(OTf)_4$ can catalyze the proposed retro-hydroalkoxylation steps (FIG. 4A, steps a and c, FIG. 2A). Using Pd/C alone produces a mixture of aromatic and aliphatic products in ~80% yield, with 5 obtained in only 13% yield. These results demonstrate that both the Hf and Pd catalysts allow for efficient PET C—O hydrogenolysis and formation of 5.

The present solventless tandem catalytic process is equally effective in actual post-consumer plastics conversion, e.g., beverage bottles, polyester shirts, and pillow stuffing, converting 1.0 g of the plastic to 5 in 97%, 96%, and 95% yield, respectively (Table 1 Entries 7-9, FIG. 3B), and indicating negligible effects of any processing/-stabilizing plastic additives on the catalytic process. This reaction was also scaled to one full PET bottle without significant loss in activity or conversion and operates in the presence of the comingled but inert polypropylene bottle cap (Table 1, Entry 10). Similarly, commercial and post-consumer poly butylene terephthalate (PBT), which is used extensively in construction, electronics, and automotive parts, was selectively converted to 5 and butane in 99% and 93% yield, respectively (Table 1 Entry 11-12, FIG. 3C). In addition, when a PET-PBT plastic mixture is used, 5 is obtained selectively and quantitatively (99%) (Table 1, Entry 13), demonstrating that this process can simultaneously handle several types of plastics. Headspace GC analysis shows that ethane and butane are the two major co-products, together with minor amounts of intermediate ethylene and butene. In the case of higher $T_g/T_m$ polyethylene naphthalate (PEN), the reaction temperature was raised to slightly above $T_m$, 280° C., yielding 2,6-naphthalene-dicarboxylic acid (6) and the corresponding mono-ethyl ester in 62% and 3% yield, respectively (Table 1 Entry 14).

Conclusions

This Example demonstrates that a tandem catalytic system combining homogeneous and heterogeneous catalysts, $Hf(OTf)_4$ and Pd/C, respectively, catalyzes the selective solvent-free hydrogenolytic depolymerization of the primary ester commodity polyester plastics PET, PBT, and PEN under 1 atmosphere of $H_2$. The process proceeds in high yields and selectively to afford the corresponding monomers, terephthalic acid (PET and PBT), and naphthalene dicarboxylic acid (PEN), as well as ethane (PET and PEN) and butane (PBT). The high yields and selectivities are entirely unexpected in view of earlier small-molecule ester studies establishing that primary esters, non-conjugated (saturated) aliphatic alkoxy substituents, and steric hindrance greatly suppress catalytic activities. The polyester deconstruction process is effective for both pristine and waste plastics and operates in the presence of inert polypropylene and with mixed plastics. Experimental and theoretical mechanistic analyses with a model ester and diester suggest reaction proceeds via a near-thermoneutral $Hf(OTf)_4$-catalyzed retro-hydroalkoxylation step followed by an exergonic olefin hydrogenation step, driving the overall reaction to completion.

Additional Experimental Information

Table 1 Entry 1

(1)

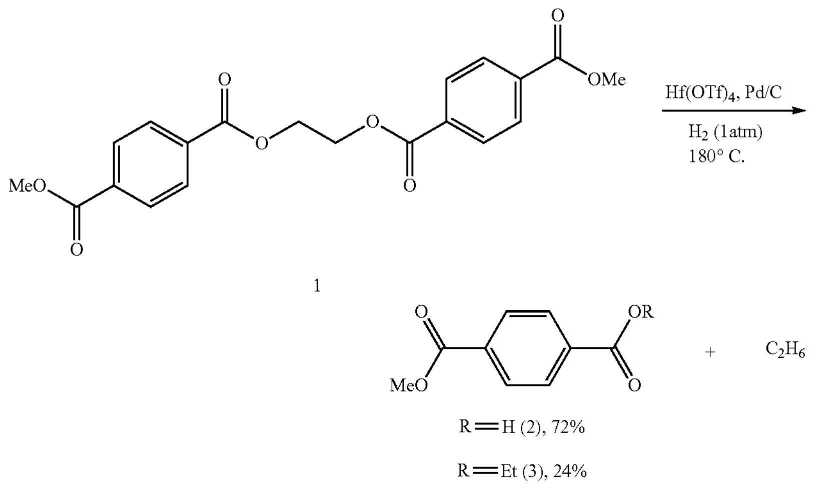

Exactly 0.091 g ($2.35*10^{-4}$ mol) of 1 (dried over $CaH_2$), 0.0057 g ($7.35*10^{-5}$ mol) of $Hf(OTf)_4$ and 0.0013 g ($1.22*10^{-6}$ mol) of Pd/C (ester:Hf:Pd ratio of 400:6:1) were charged in a dry 100 mL cylindrical Schenck flask inside a glove box. The flask was carefully purged with Ar five times, charged with $H_2$, and then heated while stirring at 180° C. for 24 h. After the reaction was complete, 2 mL of DMSO-$d_6$ containing 0.0228 g of mesitylene were added, and 0.5 mL of the reaction mixture was charged in an NMR tube. Products 2 and 3 were obtained in 72% and 24% yield, respectively.

* When $D_2$ was used instead of $H_2$ deuterated 2-$d_1$, MeO(O)CPhCOOD was obtained.

Hydrogenolysis of 2-$d_4$ (S1)

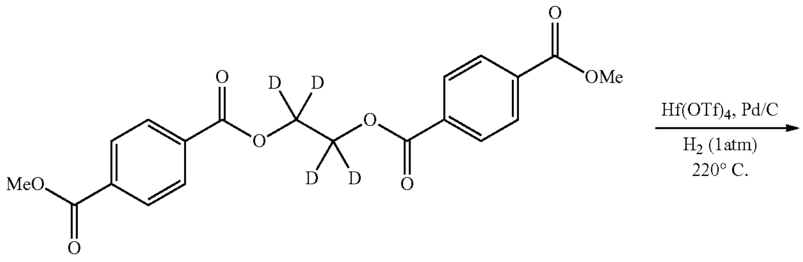

1-$d_4$

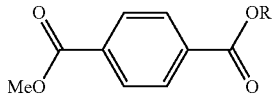

R═D/H, 46%

R═d-ET, 26%

Exactly 0.085 g ($2.17*10^{-4}$ mol) of 1-$d_4$, 0.0125 g (1.61*10-5 mol) of $Hf(OTf)_4$ and 0.0013 g (1.22*10-6 mol) of Pd/C (ester:Hf:Pd ratio of 400:54:1) were charged in a dry 100 mL cylindrical Schenck flask inside a glove box. The flask was carefully purged with Ar five times, charged with $H_2$, and then heated while stirring at 220° C. for 4 h. After the reaction was complete, 2 mL of DMSO-$d_6$ containing 0.0151 g of mesitylene were added, and 0.5 mL of the reaction mixture was charged into an NMR tube. 2 and 2-$d_1$ and 3-d were obtained in 46% and 26% yield, respectively.

Table 1 Entry 2

(S2)

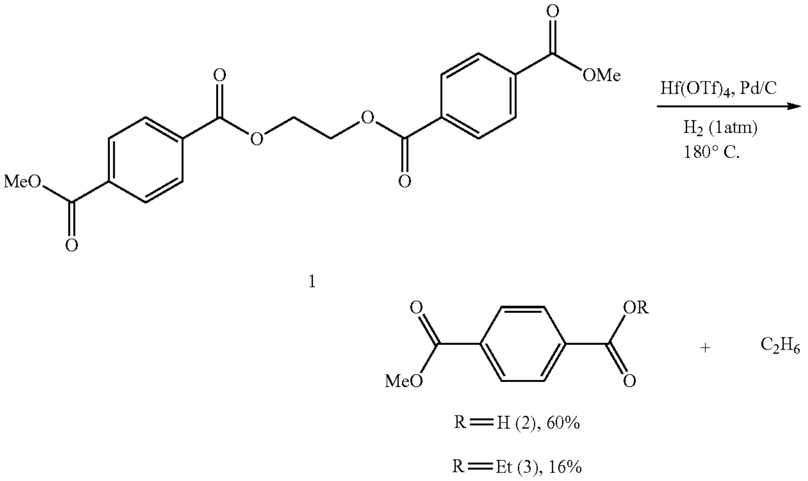

1

Exactly 0.18 g ($4.66*10^{-4}$ mol) of 1 (dried over $CaH_2$), 0.0038 g (4.90*106 mol) of $Hf(OTf)_4$ and 0.0009 g ($8.49*10^{-7}$ mol) of Pd/C (ester:Hf:Pd ratio of 1200:6:1) were charged in a dry 100 mL cylindrical Schenck flask inside a glove box. The flask was carefully purged with Ar five times, charged with $H_2$, and then heated while stirring at 180° C. for 48 h. After the reaction was complete, 2 mL of DMSO-$d_6$ and 1 mL of DCM-$d_2$ (improves the solubility of 1) containing 0.0216 g of mesitylene were added, and 0.5 mL of the reaction mixture was charged in an NMR tube. 2 and 3 were obtained in 60% and 16% yield, respectively.

Table 1 Entry 3

(S3)

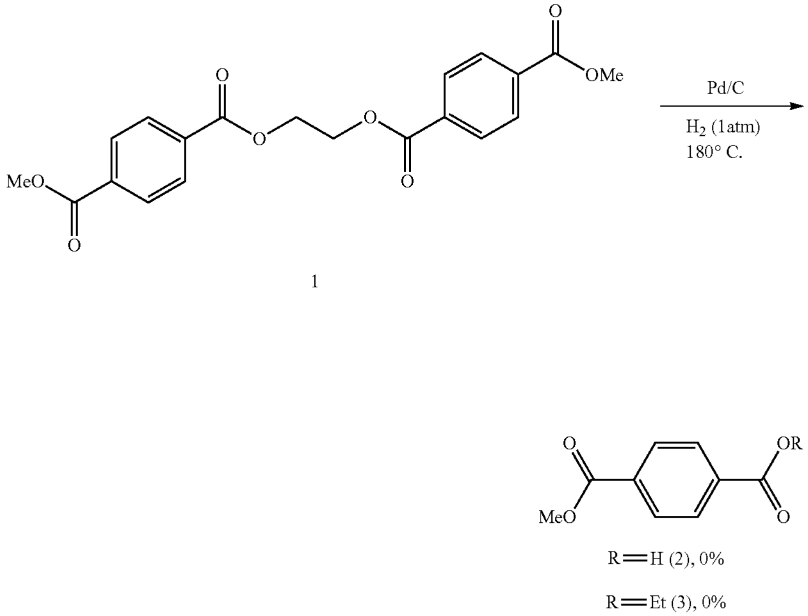

1

Exactly 0.09 g ($2.33*10^{-4}$ mol) of 1 (dried over $CaH_2$) and 0.0013 g ($1.22*10^{-6}$ mol) of Pd/C (ester:Hf:Pd ratio of 400:0:1) were charged in a dry 100 mL cylindrical Schenck flask inside a glove box. The flask was carefully purged with Ar five times, charged with $H_2$, and then heated while stirring at 180° C. for 24 h. After the reaction was complete, 2 mL of DMSO-$d_6$ and 1 mL of DCM-$d_2$ containing 0.0192 g of mesitylene were added, and 0.5 mL of the reaction mixture was charged in an NMR tube. 2 and 3 were obtained in 0% yield.

Table 1 Entry 4

(S4)

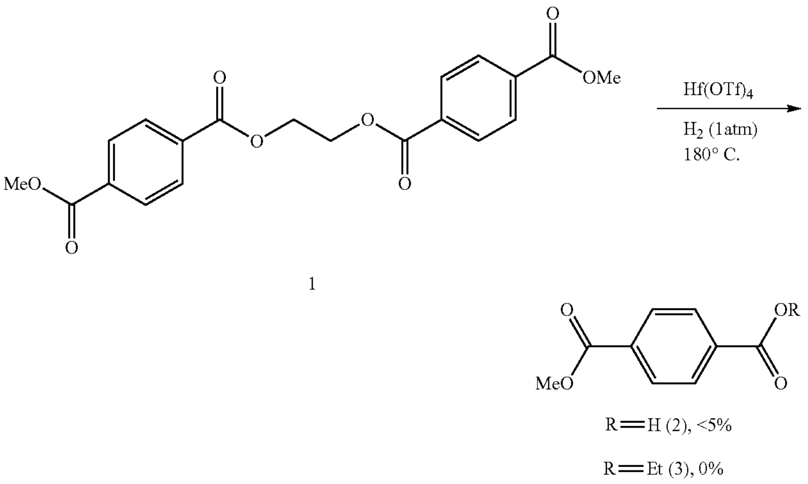

Exactly 0.09 g ($2.33*10^{-4}$ mol) of 1 (dried over $CaH_2$), 0.0057 g ($7.35*10^{-6}$ mol) of $Hf(OTf)_4$ (ester:Hf:Pd ratio of 400:6:0) were charged in a dry 100 mL cylindrical Schenck flask inside a glove box. The flask was carefully purged with Ar five times, charged with $H_2$, and then heated while stirring at 180° C. for 24 h. After the reaction was complete, 2 mL of DMSO-$d_6$ and 1 mL of DCM-$d_2$ containing 0.0216 g of mesitylene were added, and 0.5 mL of the reaction mixture was charged in an NMR tube. Products 2 and 3 were obtained in <5% and 0% yield, respectively.

Table 1 Entry 5

(S5)

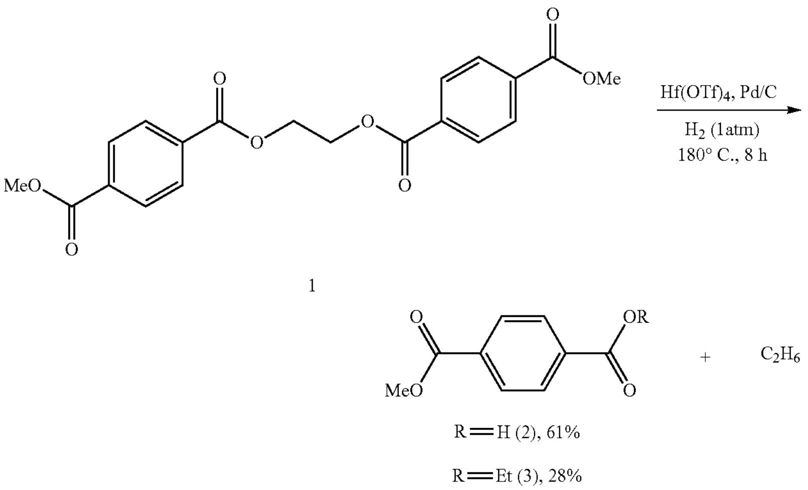

Exactly 0.090 g ($2.33*10^{-4}$ mol) of 1 (dried over $CaH_2$), 0.0057 g ($7.35*10^{-5}$ mol) of $Hf(OTf)_4$ and 0.0013 g ($1.22*10^{-6}$ mol) of Pd/C (ester:Hf:Pd ratio of 400:6:1) were charged in a dry 100 mL cylindrical Schenck flask inside a glove box. The flask was carefully purged with Ar five times, charged with $H_2$, and then heated while stirring at 180° C. for 8 h. After the reaction was complete, 2 mL of DMSO-$d_6$ containing 0.0206 g of mesitylene were added, and 0.5 mL of the reaction mixture was charged in an NMR tube. Products 2 and 3 were obtained in 61% and 28% yield, respectively.

Table 1 Entry 6

(S6)

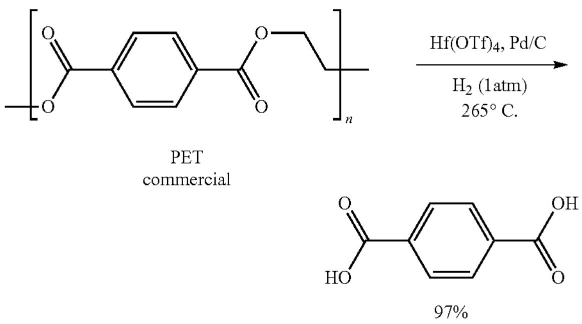

Exactly 1 g ($5.2*10^{-3}$ mol) of commercial PET powder (300 μm), 0.121 g ($1.56*10^{-4}$ mol) of $Hf(OTf)_4$ and 0.0275 g ($2.59*10^{-5}$ mol) of Pd/C (ester:Hf:Pd ratio of 400:6:1) were charged in a 25×200 mm reaction tube and sealed with a septum. The septum was then pierced with a needle connected to a gas delivery balloon. The tube and gas delivery balloon were carefully purged with the Ar five times, charged with $H_2$, and then heated without stirring at 265° C. for 24 h. After the reaction was complete, 5 mL of DMSO-$d_6$ containing 0.0321 g of mesitylene were added, and 0.5 mL of the reaction mixture was charged in an NMR tube. Terephthalic acid was obtained in a 98% yield.

Table 1 Entry 7

(S7)

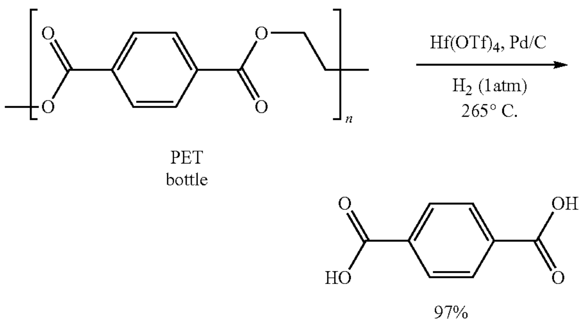

Exactly 1 g ($5.2*10^{-3}$ mol) of post-consumer PET bottle chips, 0.121 g ($1.56*10^{-4}$ mol) of $Hf(OTf)_4$, and 0.0275 g ($2.59*10^{-5}$ mol) of Pd/C (ester:Hf:Pd ratio of 400:6:1) were charged in a 25×200 mm reaction tube and sealed with a septum. The septum was then pierced with a needle connected to a gas delivery balloon. The tube and gas delivery balloon were carefully purged with the Ar five times, charged with $H_2$, and then heated without stirring at 265° C. for 24 h. After the reaction was complete, 5 mL of DMSO-$d_6$ containing 0.0358 g of mesitylene were added, and 0.5 mL of the reaction mixture was charged in an NMR tube. Terephthalic acid was obtained in 97% yield.

* When a full PET bottle was used, terephthalic acid was obtained in 90% isolated yield.

Table 1 Entry 8

(S8)

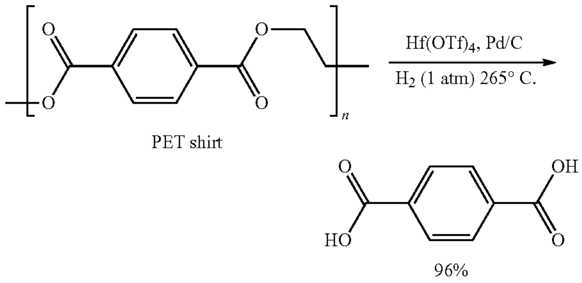

Exactly 1 g ($5.2*10^{-3}$ mol) of 100% polyester shirt, 0.121 g ($1.56*10^{-4}$ mol) of $Hf(OTf)_4$ and 0.0275 g ($2.59*10^{-5}$ mol) of Pd/C (ester:Hf:Pd ratio of 400:6:1) were charged in a 25×200 mm reaction tube and sealed with a septum. The septum was then pierced with a needle connected to a gas delivery balloon. The tube and gas delivery balloon were carefully purged with the Ar five times, charged with $H_2$, and then heated without stirring at 265° C. for 24 h. After the reaction was complete, 5 mL of DMSO-$d_6$ containing 0.1186 g of mesitylene were added, and 0.5 mL of the reaction mixture was charged in an NMR tube. Terephthalic acid was obtained in a 96% yield.

Table 1 Entry 9

(S9)

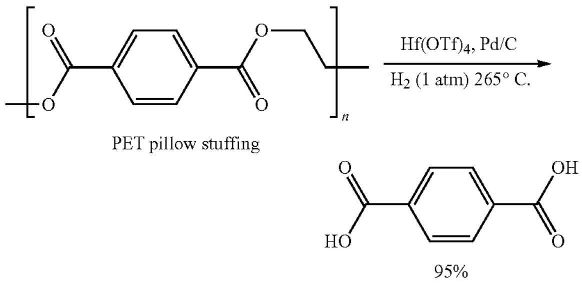

Exactly 1 g ($5.2*10^{-3}$ mol) of a polyester pillow stuffing, 0.121 g ($1.56*10^{-4}$ mol) of $Hf(OTf)_4$ and 0.0275 g ($2.59*10^{-5}$ mol) of Pd/C (ester:Hf:Pd ratio of 400:6:1) were charged in a 25×200 mm reaction tube and sealed with a septum. The septum was then pierced with a needle connected to a gas delivery balloon. The tube and gas delivery balloon were carefully purged with the Ar five times, charged with $H_2$, and then heated without stirring at 265° C. for 24 h. After the reaction was complete, 5 mL of DMSO-$d_6$ containing 0.1259 g of mesitylene were added, and 0.5 mL of the reaction mixture was charged in an NMR tube. Terephthalic acid was obtained in a 96% yield.

Table 1 Entry 10

(S10)

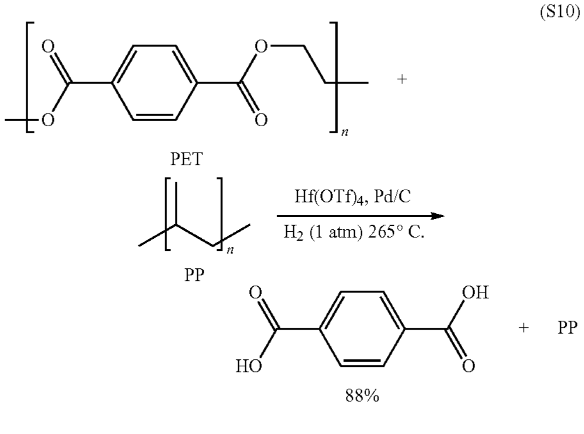

A mixed PET+isotactic polypropylene (PP) sample was prepared with a 1:0.1 ratio. This ratio was chosen based on the weight ratio of PET (bottle) and PP (cap) in a plastic beverage bottle. Exactly 1 g ($5.2*10^{-3}$ mol) of commercial PET powder (300 μm), 0.092 gr ($2.19*10^{-3}$ mol) of polypropylene (PP)(isotactic, average Mw ~55,000), 0.121 g ($1.56*10^{-4}$ mol) of $Hf(OTf)_4$ and 0.0275 g ($2.59*10^{-5}$ mol) of Pd/C (ester:Hf:Pd ratio of 400:6:1) were charged in a 25×200 mm reaction tube and sealed with a septum. The septum was then pierced with a needle connected to a gas delivery balloon. The tube and gas delivery balloon were carefully purged with the Ar five times, charged with $H_2$, and then heated without stirring at 265° C. for 24 h. When the reaction was complete, 5 mL of DMSO-$d_6$ containing 0.0436 g of mesitylene were added, and 0.5 mL of the reaction mixture was charged in an NMR tube. Terephthalic acid was obtained in 81% isolated yield. The solid residue (catalysts+PP) was separated from the reaction mixture and washed with 2 mL of $d_6$-DMSO. 2 mL of $C_2Cl_4D_2$ (TCE) were then added to the solid residual and heated at 150° C. until most of the PP dissolved. The mixture was then filtered to remove the heterogenous catalyst. Then, 0.5 mL of the filtrate was charged in an NMR tube.

Table 1 Entry 11

(S11)

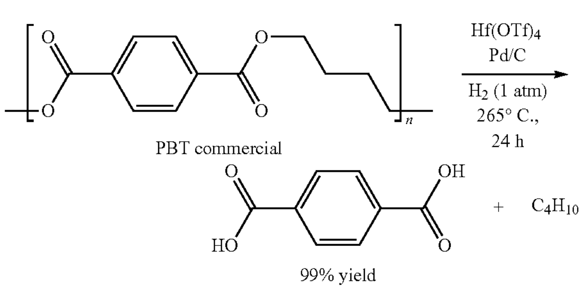

Exactly 0.1088 g ($4.94*10^{-4}$ mol) of commercial PBT pellets, 0.0115 g ($1.48*10^{-5}$ mol) of $Hf(OTf)_4$, and 0.0026 g ($2.45*10^{-6}$ mol) of Pd/C (ester:Hf:Pd ratio of 400:6:1) were charged in a 25×200 mm reaction tube and sealed with a septum. The septum was then pierced with a needle connected to a gas delivery balloon. The tube and gas delivery balloon were carefully purged with the Ar five times, charged with $H_2$, and then heated without stirring at 265° C. for 24 h. After the reaction was complete, 2 mL of DMSO-$d_6$ containing 0.0213 g of mesitylene were added, and 0.5 mL of the reaction mixture was charged in an NMR tube. Terephthalic acid was obtained in a 99% yield.

Table 1 Entry 12

(S12)

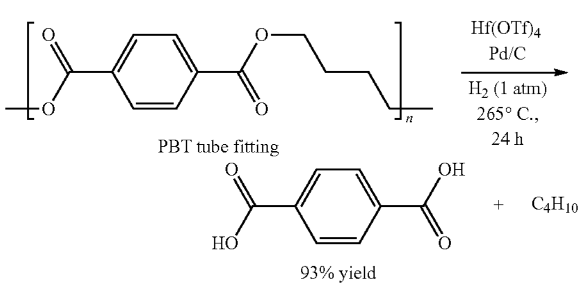

Exactly 0.1088 g ($4.94*10^{-4}$ mol) of a post-consumer tube fitting PBT chips, 0.0115 g ($1.48*10^{-5}$ mol) of $Hf(OTf)_4$, and 0.0026 g ($2.45*10^{-6}$ mol) of Pd/C (ester:Hf:Pd ratio of 400:6:1) were charged in a 25×200 mm reaction tube and sealed with a septum. The septum was then pierced with a needle connected to a gas delivery balloon. The tube and gas delivery balloon were carefully purged with the Ar five times, charged with $H_2$, and then heated without stirring at 265° C. for 24 h. After the reaction was complete, 2 mL of DMSO-$d_6$ containing 0.0213 g of mesitylene were added, and 0.5 mL of the reaction mixture was charged in an NMR tube. Terephthalic acid was obtained in 99% yield.

Table 1 Entry 13

(S13)

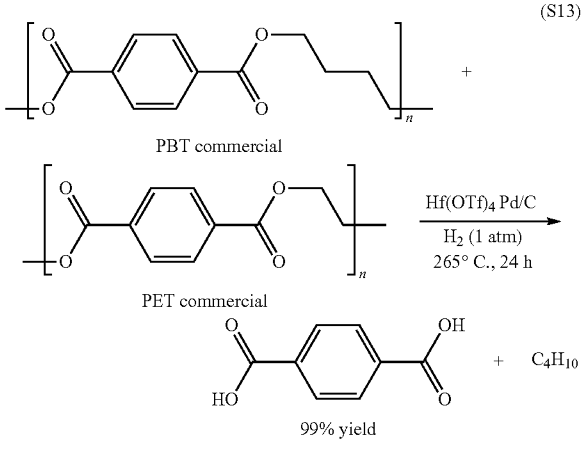

Exactly 0.1088 g ($4.94*10^{-4}$ mol) of a commercial PBT pellets and 0.0900 g ($4.68*10^{-4}$ mol) of commercial PET powder, 0.0225 g ($2.90*10^{-5}$ mol) of $Hf(OTf)_4$, and 0.0051 g ($4.81*10^{-6}$ mol) of Pd/C (ester:Hf:Pd ratio of 400:6:1) were charged in a 25×200 mm reaction tube and sealed with a septum. The septum was then pierced with a needle connected to a gas delivery balloon. The tube and gas delivery balloon were carefully purged with the Ar five times, charged with $H_2$, and then heated without stirring at 265° C. for 24 h. After the reaction was complete, 4 mL of DMSO-$d_6$ containing 0.0193 g of mesitylene were added, and 0.5 mL of the reaction mixture was charged in an NMR tube. Terephthalic acid was obtained in 99% yield.

Table 1 Entry 14

(S14)

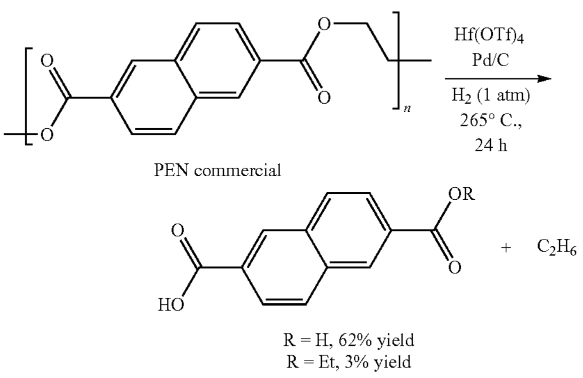

Exactly 0.101 g ($4.15*10^{-4}$ mol) of commercial PEN pellets, 0.0096 g ($1.23*10^{-5}$ mol) of $Hf(OTf)_4$, and 0.0022 g ($2.07*10^{-6}$ mol) of Pd/C (ester:Hf:Pd ratio of 400:6:1) were charged in a 25×200 mm reaction tube and sealed with a septum. The septum was then pierced with a needle connected to a gas delivery balloon. The tube and gas delivery balloon were carefully purged with the Ar five times, charged with $H_2$, and then heated without stirring at 265° C. for 24 h. After the reaction was complete, 2 mL of DMSO-$d_6$ containing 0.0228 g of mesitylene were added, and 0.5 mL of the reaction mixture was charged into an NMR tube. 2,6-naphthalenedicarboxylic acid and its corresponding monoethyl ester in 49% and 9% yield, respectively. Increasing the catalysts loadings to an ester:Hf:Pd ratio of 400:20:3.3 produced 2,6-naphthalenedicarboxylic acid and its corresponding monoethyl ester in 62% and 3% yield, respectively Procedures and NMR Spectroscopy of Control Reactions Heating PET in the Presence of Only $Hf(OTf)_4$, and $H_2$ (S15)

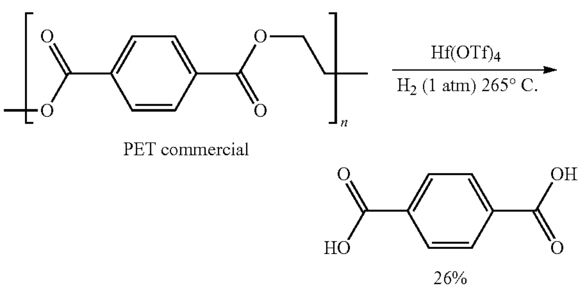

Exactly 0.09 g ($4.68*10^{-4}$ mol) of commercial PET powder (300 μm), 0.011 g ($1.41*10^{-4}$ mol) of $Hf(OTf)_4$ (ester:Hf:Pd ratio of 400:6:0) were charged in a 25×200 mm reaction tube and sealed with a septum. The septum was then pierced with a needle connected to a gas delivery balloon. The tube and gas delivery balloon were carefully purged with the Ar five times, charged with $H_2$, and then heated without stirring at 265° C. for 24 h. After the reaction was complete, 2 mL of DMSO-$d_6$ containing 0.0201 g of mesitylene were added, and 0.5 mL of the reaction mixture was charged in an NMR tube. Terephthalic acid was obtained in a 26% yield.

Heating PET in the Presence of Only Pd/C and $H_2$ (S16)

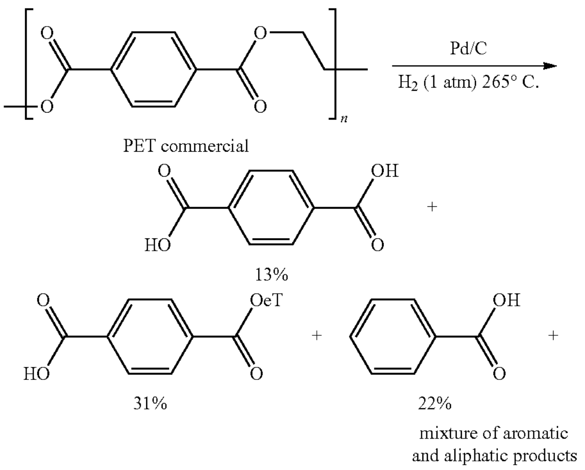

Exactly 0.09 g ($4.68*10^{-4}$ mol) of commercial PET powder (300 μm) and 0.0025 g ($2.35*10^{-6}$ mol) of Pd/C (ester:Hf:Pd ratio of 400:0:1) were charged in a 25×200 mm reaction tube and sealed with a septum. The septum was then pierced with a needle connected to a gas delivery balloon. The tube and gas delivery balloon were carefully purged with the Ar five times, charged with $H_2$, and then heated without stirring at 265° C. for 24 h. After the reaction is complete, 2 mL of DMSO-$d_6$ containing 0.0200 g of mesitylene were added, and 0.5 mL of the reaction mixture was charged in an NMR tube. Terephthalic acid, ethyl ester, and benzoic acid were obtained in 13%, 31%, and 22% yield together with a mixture of unidentified products (aromatic and aliphatic).

GC Analysis

The headspace gas in the reactors was first collected using a 10 mL airtight syringe at the end of the reaction and then manually injected into the gas chromatograph equipped with a flame ionization detector (FID).

Reaction 1

(1)

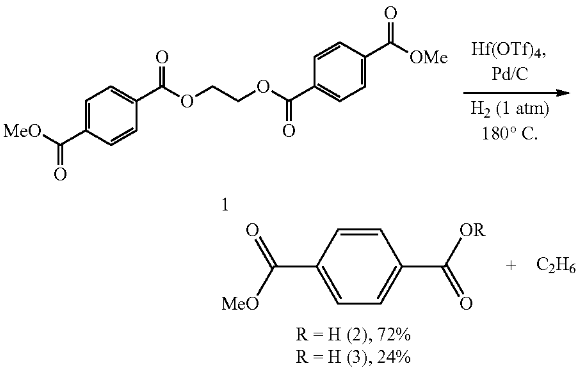

According to the GC chromatogram, ethane was obtained as the major product.

Reaction a in Scheme 1 (FIG. 4C)

(S17)

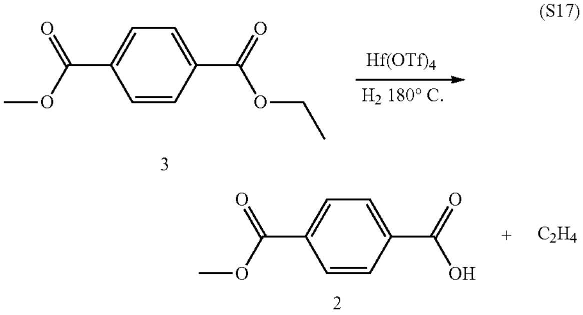

3

2

Ethyl ester 3 was reacted with $Hf(OTf)_4$ in the presence of $H_2$ at 180° C. The headspace gas was collected at the end of the reaction, and according to the GC chromatogram, ethylene was obtained as the major product.

Reaction b in Scheme 1 (FIG. 4C)

(S18)

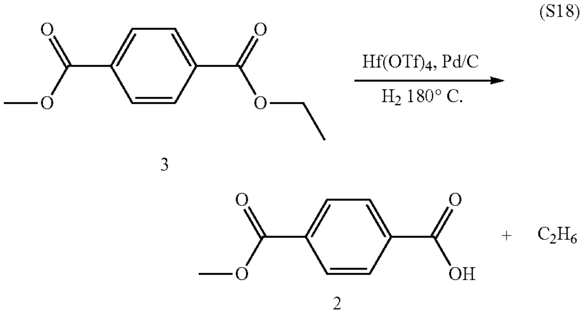

3

2

Ethyl ester 3 was reacted with $Hf(OTf)_4$ and Pd/C in the presence of $H_2$ at 180° C. The headspace gas was collected at the end of the reaction, and according to the GC chromatogram, ethane was obtained as the major product.

Figure 3A:
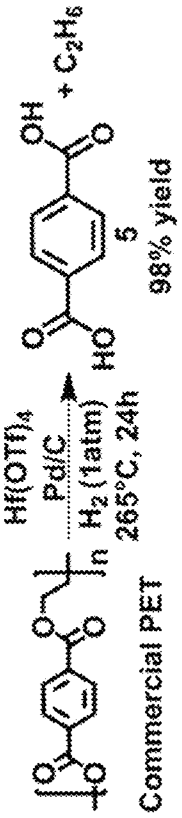
FIGS. 3A-3C illustrate the hydrogenolytic solventless depolymerization of commodity polyesters (FIGS. 3A, 3C) and post-consumer products (FIG. 3B) using embodiments of the present methods. In each, the conditions were: Ester:Hf:Pd ratio of 400:6:1, 265° C., 24 h, 1 atm $H_2$.
Figure 3B:
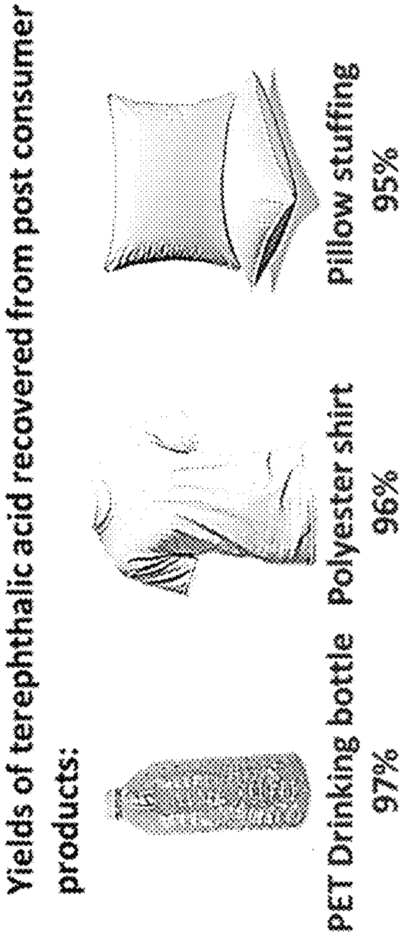

Reaction in FIG. 3A (S6)

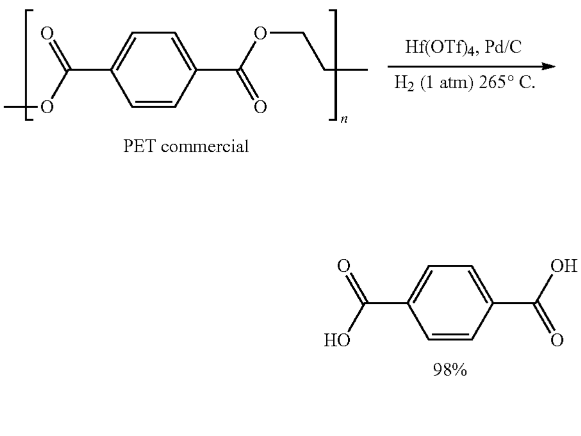

According to the GC analysis, ethane was obtained as the major product. A small amount of ethylene was also observed.

Figure 3C:
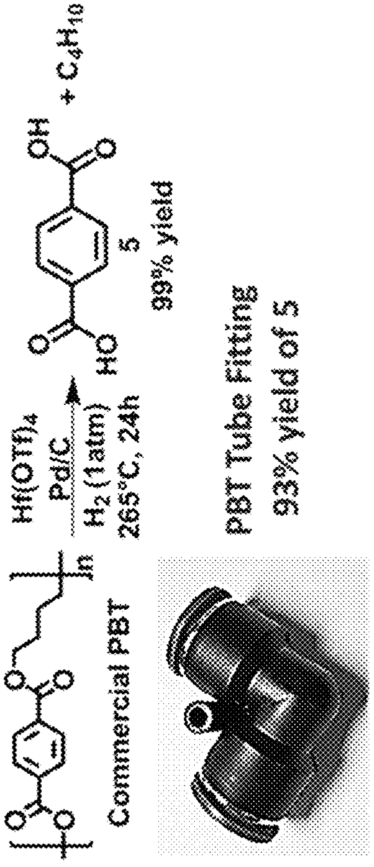

Reaction in FIG. 3C (S11)

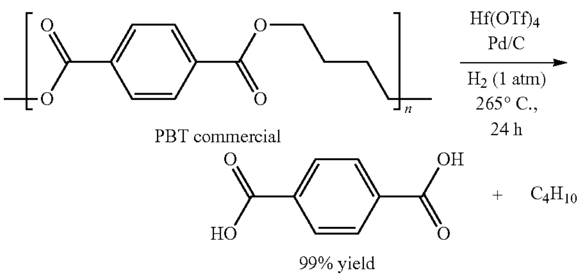

According to the GC chromatogram, butane was obtained as the major product.

Table 1 Entry 13

(S13)

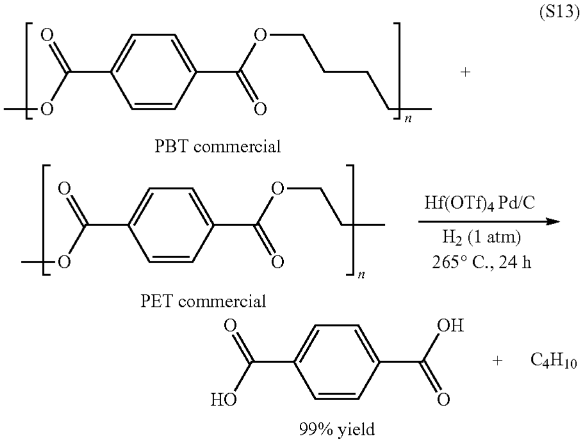

According to the GC chromatogram, ethane and butane were the two major products, together with minor amounts of intermediate ethylene and butene.

Consumption of Diester 1 as a Function of Time

Monitoring the consumption of 1 (0.09 g, $2.33*10^{-4}$ mol) as a function of time in the presence of 0.0057 g ($7.35*10^{-5}$ mol) of $Hf(OTf)_4$ and 0.0013 g ($1.22*10^{-6}$ mol) of Pd/C (ester:Hf:Pd ratio of 400:6:1) under 1 atm of $H_2$ at 180° C. revealed a linear substrate consumption. The rate that the reaction proceeds can be described as the change in the concentration of 1 with respect to time[2] and by plotting conversion of 1 Vs. (O. Levenspiel, *Chemical Reaction Engineering 3rd Edition*, John Wiley & Sons, Inc., 1999.) Time, a zero-order dependence on the substrate concentration was observed.

Kinetic Isotope Effect

The kinetic isotope effect (KIE) for the diester hydrogenolysis was probed by comparing the hydrogenolysis rates of 1-$d_4$ with the all-proto isotopomer 1. Performing the experiments at 1 atm $H_2$ and 180° C. with $Hf(OTf)_4$ and Pd/C (ester:Hf:Pd ratio of 400:6:1) revealed a slight decrease in the rate of 1-da consumption versus that of 1. Under these conditions, the KIE=1.16.

DFT Calculations

All quantum chemical calculations were performed using the ORCA software package. (Calculations were carried out using the ORCA 4.1.0 software; F. Neese, The ORCA program system, *Wiley Interdiscip. Rev.: Comput. Mol. Sci.*, 2012, 2, 73-78.) Geometries were calculated at the B3LYP- 3D/ZORA-def2-svp (for all atoms except Hf), and SARC-ZORA-TZVP for Hf, level of theory (frequency calculations at the same level were performed to validate each structure as a minimum or a transition state), followed by single-point calculations with a higher level of theory [ma-ZORA-def2-TZVPP (for all atoms except Hf), SARC-ZORA-TZVPP for Hf] and SMD solvation model (ethyl acetate as solvent) for more accurate energetic values. IRC (internal reaction coordinate) calculations starting from the transition structures were performed and verified the reactants and products. (For B3LYP-3D, see A. D. Becke, *J. Chem. Phys.,* 1993, 98, 5648-5652; P. J. Stephens, F. J. Devlin, C. F. Chabalowski and M. J. Frisch, *J. Phys. Chem.,* 1994, 98, 11623-11627.)

DFT-Derived Thermodynamics

TABLE 2

Calculated ΔG and ΔH values relative to 1 + $2H_2$ for each step in FIG. 4A.

| | ΔG (kcal/mol) | ΔH (kcal/mol) |
|---|---|---|
| Step a | −3.7 | 10.4 |
| Step b | −21.5 | −30.3 |
| Step c | 1.7 | 13.4 |
| Step d | −24.3 | −32.3 |
| Overall | −47.8 | −38.8 |

TABLE 3

Calculated ΔG and ΔH values relative to $Hf(OTf)_4$ + ethyl acetate for each step in FIG. 2A.

| | ΔG (kcal/mol) | ΔH (kcal/mol) |
|---|---|---|
| $Hf(OTf)_4$ + Ethyl acetate -> INT 1 | −1.4 | −16.5 |
| TS1 | 33.4 | 19.4 |
| INT2 | 23.2 | 9.4 |
| TS2 | 31.5 | 17.1 |
| INT3 | 4.7 | −8.0 |
| $Hf(OTf)_4$ + Acetic acid + Ethylene | 2.4 | 13.5 |
| Ethylene-> Ethane | −21.8 | −18.8 |

Additional information may be found in U.S. provisional patent application No. 63/271,311 that was filed Oct. 25, 2021, the entire contents of which are incorporated herein by reference.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for depolymerizing a polyester, the method comprising combining a polyester comprising a plurality of ester linking groups (R'C(O)OR), a metal triflate catalyst, and a hydrogenation catalyst, under conditions to cleave a C—O bond in an alkoxy group (OR) of an ester linking group of the plurality of ester linking groups to depolymerize the polyester to a dicarboxylic acid and an alkane, wherein the carbon of the cleaved C—O bond is a primary carbon, R is a saturated aliphatic group, and R' is an aromatic group or a heterocyclic group wherein the metal triflate catalyst is $Hf(OTf)_4$; the hydrogenation catalyst is Pd/C; depolymerization of polyester is carried out at a temperature of 265° C., for a time period of 24 hours, under a pressure of 1 atm $H_2$, and an (ester):(Hf):(Pd) molar ratio of 400:6:1; and said method achieves an initial yield of at least 81% of the dicarboxylic acid, and further wherein the polyester is PET, PBT, or a combination thereof.

2. The method of claim 1, wherein the polyester, the metal triflate catalyst, and the hydrogenation catalyst form a reaction mixture that is free of a solvent and free of an additive other than $H_2$.

3. The method of claim 1, wherein the polyester is provided as a blend with a non-polyester polymer and the non-polyester polymer remains intact after the method, and further wherein the non-polyester polymer is polypropylene.

* * * * *